US012800774B2

(12) United States Patent
Su

(10) Patent No.: US 12,800,774 B2
(45) Date of Patent: Nov. 17, 2026

(54) POSITIONING METHOD AND RELATED APPARATUS

(71) Applicant: TENCENT TECHNOLOGY (SHENZHEN) COMPANY LIMITED, Shenzhen (CN)

(72) Inventor: Jinglan Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 265 days.

(21) Appl. No.: 18/637,649

(22) Filed: Apr. 17, 2024

(65) Prior Publication Data

US 2024/0272307 A1 Aug. 15, 2024

Related U.S. Application Data

(63) Continuation of application No. PCT/CN2023/085858, filed on Apr. 3, 2023.

(30) Foreign Application Priority Data

May 13, 2022 (CN) ......................... 202210520192.3

(51) Int. Cl.
*G01S 19/48* (2010.01)
*H04B 17/309* (2015.01)
*H04W 64/00* (2009.01)

(52) U.S. Cl.
CPC .......... *G01S 19/485* (2020.05); *H04B 17/346* (2023.05); *H04W 64/006* (2013.01)

(58) Field of Classification Search
CPC ........ G01S 19/485; G01S 19/22; G01S 19/42; G01S 19/04; G01S 19/06; G01S 19/05;
(Continued)

(56) References Cited

U.S. PATENT DOCUMENTS 6,456,938 B1 * 9/2002 Barnard .................. G01S 19/19
701/487
9,766,349 B1 9/2017 Madhow et al.
(Continued)

FOREIGN PATENT DOCUMENTS

CN 104035112 A 9/2014
CN 107966724 A 4/2018
(Continued)

OTHER PUBLICATIONS

The World Intellectual Property Organization (WIPO) International Search Report for PCT/CN2023/085858 Jul. 8, 2023 6 Pages (including translation).
(Continued)

*Primary Examiner* — Shahbaz Nazrul
(74) *Attorney, Agent, or Firm* — ANOVA LAW GROUP, PLLC

(57) ABSTRACT

A positioning method includes: obtaining an approximate location of a target terminal; obtaining a satellite signal carrier-to-noise ratio; transmitting the approximate location to a three-dimensional city model server; receiving three-dimensional building information that is calculated based on the approximate location and that is transmitted by the three-dimensional city model server; calculating a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal; and calculating positioning information of the target terminal based on the satellite visibility probability and the satellite signal.

16 Claims, 10 Drawing Sheets

(58) Field of Classification Search
CPC ...... G01S 19/073; G01S 19/258; G01S 19/43; G01S 19/33; G01S 19/37; G01S 19/41; G01S 19/46; H04B 17/346; H04W 64/006
See application file for complete search history.

(56) References Cited

U.S. PATENT DOCUMENTS

| | | | | |
|---|---|---|---|---|
| 10,656,282 | B2 * | 5/2020 | Irish | G01S 19/428 |
| 10,809,388 | B1 | 10/2020 | Carcanague et al. | |
| 2008/0100506 | A1 | 5/2008 | Gradine et al. | |
| 2019/0094379 | A1 * | 3/2019 | Chhokra | G01S 19/40 |
| 2021/0239849 | A1 | 8/2021 | Lavi et al. | |
| 2021/0325548 | A1 | 10/2021 | Garin et al. | |
| 2022/0066048 | A1 * | 3/2022 | Diggelen | G01S 19/396 |
| 2022/0283318 | A1 | 9/2022 | Li et al. | |
| 2023/0121760 | A1 * | 4/2023 | Bennington | G01S 19/28 342/357.45 |
| 2024/0302183 | A1 * | 9/2024 | Berkovich | G01C 21/3807 |
| 2025/0142513 | A1 * | 5/2025 | Shimizu | H04W 64/00 |

FOREIGN PATENT DOCUMENTS

| | | | |
|---|---|---|---|
| CN | 112444834 | A | 3/2021 |
| CN | 112666588 | A | 4/2021 |
| CN | 112924997 | A | 6/2021 |

OTHER PUBLICATIONS

Elliott D.Kaplan et al. "Understanding GPS Principles and Applications", "Publishing House of Electronics Industry", 2012.
Youjian Hu et al. "Global Positioning System (GPS) Principles and Applications", Books published by China University of Geosciences Press in 2003.
Dingfa Huang et al. "Global Positioning System (GPS): Theory and Practice", 2006.
Glonass, ICD. "Global Navigation Satellite System GLONASS, Interface Control Document, Navigational Radio Signal in bands L1, L2." (2008).
The European Patent Office (EPO) The Extended European Search Report for Application No. 23802542.3 Jun. 24, 2025 9 Pages.
Lei Wang et al., "GNSS shadow matching: Improving urban positioning accuracy using a 3D city model with optimized visibility scoring scheme." Navigation: Journal of the Institute of Navigation 60.3 (2013): 195-207.
Hoi-Fung Ng et al., "3D mapping database-aided GNSS RTK and its assessments in urban canyons." IEEE Transactions on Aerospace and Electronic Systems 57.5 (2021): 3150-3166.
China National Intellectual Property Administration (CNIPA) Office Action 1 for Application No. 202210520192.3 May 9, 2026 12 Pages (including translation).
Paul D. Groves et al., "Performance assessment of 3D-mapping-aided GNSS part 1: Algorithms, user equipment, and review." Navigation 66.2 (2019): 341-362.

* cited by examiner

POSITIONING METHOD AND RELATED APPARATUS

RELATED APPLICATIONS

This application is a continuation application of PCT Patent Application No. PCT/CN2023/085858, filed on Apr. 3, 2023, which claims priority to Chinese Patent Application No. 202210520192.3, entitled "POSITIONING METHOD AND RELATED APPARATUS" filed with the China National Intellectual Property Administration on May 13, 2022, both of which are incorporated herein by reference in their entirety.

FIELD OF THE TECHNOLOGY

The present disclosure relates to the field of positioning technologies, and in particular, to a positioning method and a related apparatus.

BACKGROUND OF THE DISCLOSURE

The global navigation satellite system (GNSS) is a space-based radio navigation and positioning system capable of providing a user with all-weather three-dimensional coordinates and speed and time information at any place on the Earth's surface or in terrestrial space. Common systems include four navigation satellite systems: the global positioning system (GPS) of the United States, the BeiDou navigation satellite system (BDS) of China, the GLONASS (short for global navigation satellite system in Russian), and the Galileo navigation satellite system (GALILEO). The GPS of the United States is the earliest positioning system, and is also a technologically comprehensive positioning system. In recent years, the BDS and the GLONASS have provided full services in the Asia-Pacific region. Particularly, the BDS has been developing faster in the civilian application field. Navigation satellite systems have been widely used in the fields of communication, personnel follow-up, consumer entertainment, surveying and mapping, timing, vehicle monitoring and management, vehicle navigation and information services, and the like.

Currently, positioning performance of the GNSS is greatly improved. However, when only GNSS satellite signals are used for positioning, real-time positioning accuracy for a civilian user is usually approximately 10 meters. This cannot meet a positioning requirement for higher positioning accuracy. In addition, high buildings in a city can block satellite signals and cause significant multi-path effects. Consequently, positioning accuracy is seriously limited.

SUMMARY

Embodiments of the present disclosure provide a positioning method and a related apparatus, to improve positioning accuracy in a scenario in which a satellite signal is seriously blocked and significant multi-path effect occurs.

In view of this, an aspect of the present disclosure provides a positioning method, the method being performed by a computer device and including: obtaining an approximate location of a target terminal to be positioned; obtaining a satellite signal carrier-to-noise ratio of a satellite signal received by the target terminal; transmitting the approximate location to a three-dimensional city model server; receiving three-dimensional building information transmitted by the three-dimensional city model server, the three-dimensional building information being calculated by the three-dimensional city model server based on the approximate location; calculating a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal; and calculating positioning information of the target terminal based on the satellite visibility probability and the satellite signal.

Another aspect of the present disclosure provides a positioning apparatus, the apparatus being deployed in a computer device and including: an obtaining module, configured to obtain an approximate location of a target terminal to be positioned, and obtain a satellite signal carrier-to-noise ratio of a satellite signal received by the target terminal; a transmitting module, configured to transmit the approximate location to a three-dimensional city model server; a receiving module, configured to receive three-dimensional building information transmitted by the three-dimensional city model server, the three-dimensional building information being calculated by the three-dimensional city model server based on the approximate location; and a processing module, configured to: calculate a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal; and calculate positioning information of the target terminal based on the satellite visibility probability and the satellite signal.

Another aspect of the present disclosure provides a computer device, including a memory, a processor, and a bus system, the memory being configured to store a computer program; the processor being configured to execute the computer program in the memory, and when the computer program is executed, the processor being enabled to perform the method in the foregoing aspects; and the bus system being configured to connect the memory and the processor, so that the memory communicates with the processor.

Another aspect of the present disclosure provides a non-transitory computer-readable storage medium, the computer-readable storage medium storing a computer program, and when the computer program runs on a computer, the computer being enabled to perform the method in the foregoing aspects.

It can be learned from the foregoing technical solutions that the embodiments of the present disclosure have the following advantages: After obtaining an approximate location of a target terminal, a positioning apparatus obtains three-dimensional building information of an environment in which the target terminal is located; determines a satellite visibility probability based on the three-dimensional building information and a carrier-to-noise ratio of a satellite signal received by the target terminal, that is, determines whether blocking occurs between the target terminal and a satellite, to indicate accuracy of the satellite signal; and finally, calculates final positioning information of the target terminal based on the satellite visibility probability and the satellite signal. In this way, the received satellite signal can be corrected based on the satellite visibility probability. This improves accuracy of positioning the target terminal based on the satellite signal in a scenario in which the satellite signal is seriously blocked and significant multi-path effect occurs.

DESCRIPTION OF EMBODIMENTS

Figure 1:
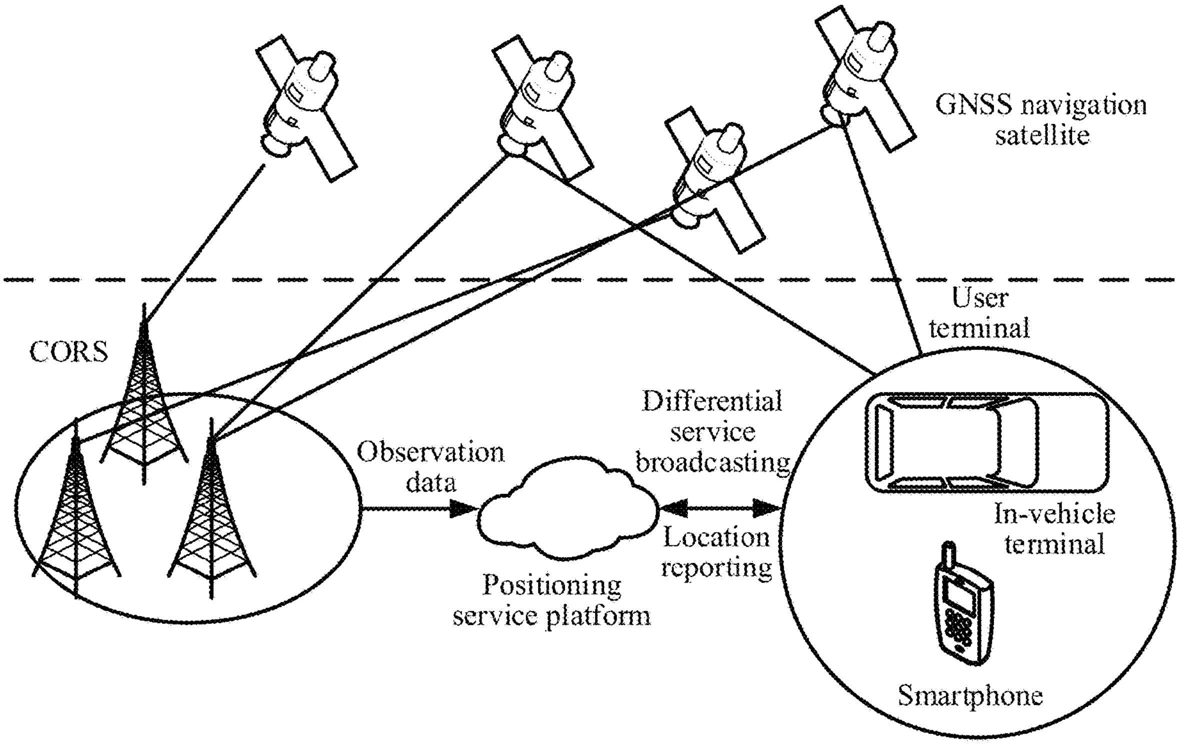
FIG. 1 is a schematic diagram of a system architecture of a CORS system.

Embodiments of the present disclosure provide a positioning method and a related apparatus, to improve positioning accuracy in a scenario in which a satellite signal is seriously blocked and significant multi-path effect occurs.

The terms "first", "second", "third", "fourth", and the like (if any) in this specification and the claims of the present disclosure and in the accompanying drawings are used for distinguishing between similar objects but not necessarily used for describing any particular order or sequence. It is to be understood that data used in this way is exchangeable in a proper case, so that the embodiments of the present disclosure described herein can be implemented in an order different from the order shown or described herein. In addition, the terms "include", "corresponding to", and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

For ease of understanding, the following describes some terms included in the present disclosure.

Location-based service (LBS): The LBS is a location-related service provided by a wireless operator for a user. The LBS obtains a current location of a positioning device by using various types of positioning technologies, and provides information resources and basic services for the positioning device through the mobile Internet. The LBS is integrated with a plurality of information technologies such as mobile communication, the Internet, spatial positioning, location information, and big data, and uses a mobile Internet service platform for data updates and exchange, so that a user can obtain a corresponding service through spatial positioning.

Global navigation satellite system (GNSS): The GNSS is a space-based radio navigation and positioning system capable of providing a user with all-weather three-dimensional coordinates and speed and time information at any place on the Earth's surface or in terrestrial space. Common systems include four navigation satellite systems: the global positioning system (GPS), the BeiDou navigation satellite system (BDS), the GLONASS (short for global navigation satellite system in Russian), and the Galileo navigation satellite system (GALILEO). The GPS is the earliest positioning system, and is also the most technologically comprehensive positioning system in this stage. In recent years, the BDS and the GLONASS have provided full services. Particularly, the BDS has been developing increasingly fast in the civil field. Navigation satellite systems have been widely used in the fields of communication, personnel follow-up, consumer entertainment, surveying and mapping, timing, vehicle monitoring and management, vehicle navigation and information services, and the like.

Satellite positioning device: an electronic device for following and processing a satellite signal and measuring a geometric distance (a pseudorange observation value) between the device and a satellite and Doppler effect (a Doppler observation value) of the satellite signal. The satellite positioning device usually includes an antenna, a satellite signal follow-up loop, a baseband signal processing module, and other modules. A mobile terminal integrated with the satellite positioning device calculates current location coordinates of the mobile terminal based on the pseudorange observation value and the Doppler observation value. The satellite positioning device is widely used in the fields of map navigation, surveying and mapping, location-based services, deep space exploration, and the like, for example, smartphone map navigation, high-definition geodetic surveying, and civil aviation. Observation values outputted by the satellite positioning device include a pseudorange, a pseudorange rate, and an accumulated delta range (ADR). The pseudorange measures the geometric distance between the satellite and the positioning device. The pseudorange rate observation value measures the Doppler effect caused by relative movement of the positioning device and the satellite. The ADR measures a variation of the geometric distance between the satellite and the positioning device.

Continuously operating reference station (CORS) system: a network reference station that sends and receives differential data, such as GPS differential data and GNSS differential data, through a network. After accessing the CORS, a user can implement differential positioning for a GPS rover station without setting up a GPS reference station separately. The user needs to use a network communications protocol for accessing the CORS system. Networked Transport of RTCM via Internet Protocol (NTRIP) is one of communications protocols for the CORS system. The CORS system is a product resulting from multi-dimensional and in-depth integration of high technologies such as a satellite positioning technology, a computer network technology, and a digital communications technology. The CORS system includes five parts: a reference station network, a data processing center, a data transmission system, a positioning and navigation data broadcasting system, and a user application system. Each reference station is connected to a monitoring and analysis center through the data transmission system to form a private network. An exemplary architecture may be shown in FIG. 1. The CORS system includes a ground reference station system, a GNSS navigation satellite, a positioning service platform, and a user terminal. The user terminal may include an in-vehicle terminal, a smartphone, an aircraft, or the like. After obtaining raw satellite observation data of the GNSS navigation satellite, the ground reference station system transmits the raw satellite observation data to the positioning service platform. In addition, the positioning service platform may further obtain data transmitted by the user terminal, or the positioning service platform may transmit data to the user terminal. In one embodiment, a location reporting service may be further performed between the positioning service platform and the user terminal.

Figure 2:
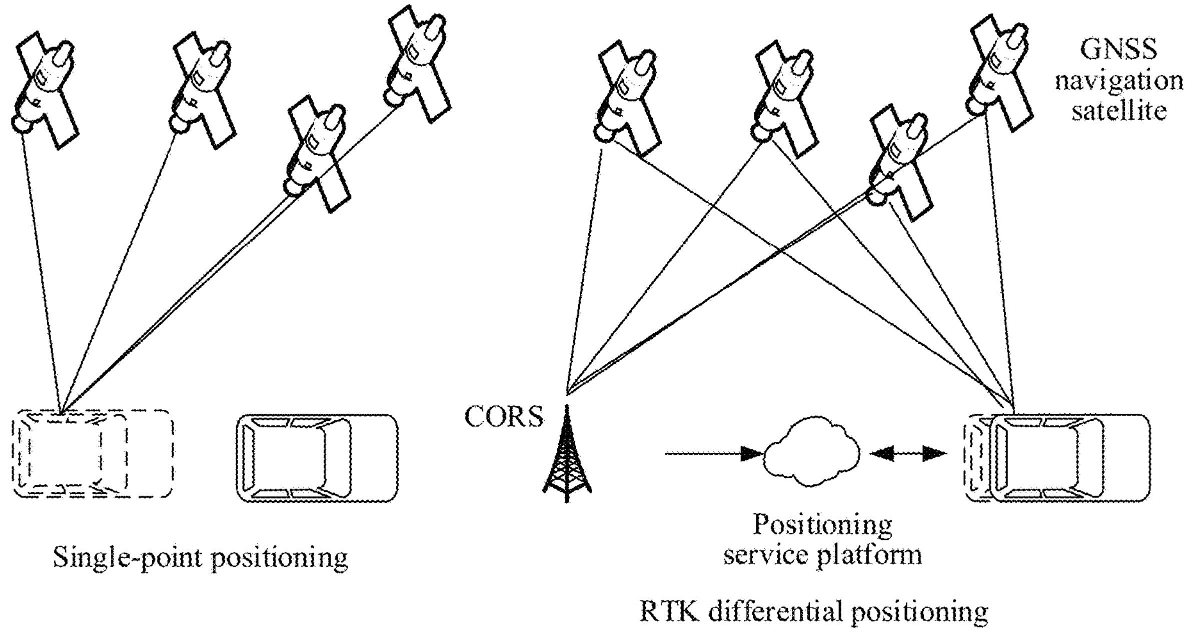
FIG. 2 is a schematic diagram of a system architecture of RTK differential positioning.

RTK differential positioning technology: a real-time kinematic positioning technology based on carrier phase observation values. A basic principle is as follows: A GPS receiver is placed on a reference station for observation. Distance correction data between the reference station and a satellite is calculated based on known precise coordinates of the reference station, and the correction data is transmitted by the reference station in real time. A user receiver receives the correction data transmitted by the reference station while performing GPS observation, and corrects a positioning result to improve positioning accuracy. Therefore, the differential positioning technology can provide a three-dimensional positioning result for an observation station in a specified coordinate system in real time and achieve centimeter-level accuracy. Compared with single-point positioning, the RTK differential positioning can eliminate impact of an atmospheric delay error, a satellite clock difference, and a user receiver clock difference. In an exemplary solution, a difference between the RTK differential positioning and the single-point positioning may be shown in FIG. 2. For example, the user receiver is an in-vehicle terminal. In the single-point positioning, the in-vehicle terminal receives satellite observation data transmitted by the GNSS navigation satellite, and then performs positioning based on the satellite observation data. In a case that the in-vehicle terminal is still moving during positioning, location information obtained through positioning based on the received observation data and actual location information of the in-vehicle terminal may have an error of 5 to 20 meters. In the RTK differential positioning, the in-vehicle terminal eliminates an error between satellite observation data received by the in-vehicle terminal and satellite observation data received by the ground reference station. In this case, location information obtained by the in-vehicle terminal through positioning and actual location information of the in-vehicle terminal may have an error of only 3 to 5 centimeters. In this case, the error may include a spatial system error, a propagation error, and an environmental error.

Figure 3:
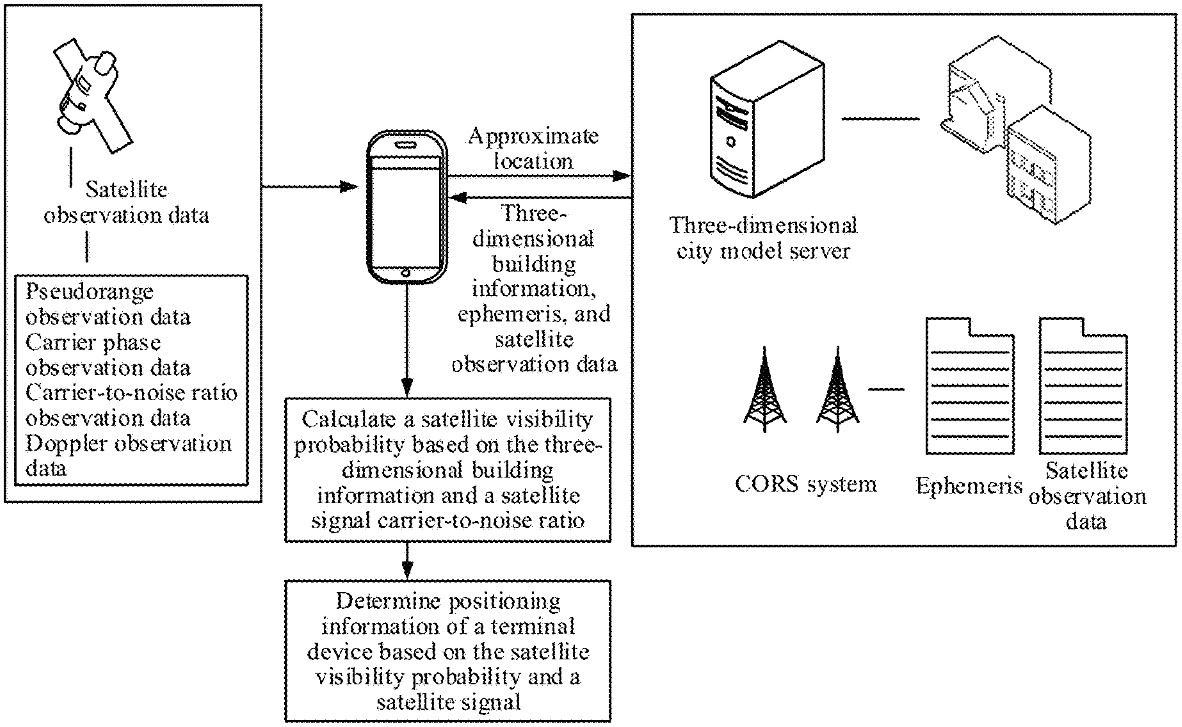
FIG. 3 is a schematic architectural diagram of a communications system according to an embodiment of the present disclosure.

The method provided in the present disclosure is applied to a communications system shown in FIG. 3. FIG. 3 is a schematic architectural diagram of a communications system according to an embodiment of the present disclosure. As shown in the figure, the communications system includes a three-dimensional city model server, a CORS system, a terminal device, and a satellite, and a positioning client may be deployed on the terminal device. The positioning client may run on the terminal device in a form of a browser, or may run on the terminal device in a form of an independent application (APP), or the like. A specific display form of the positioning client is not limited herein. The server included in the present disclosure may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal device may be a smartphone, a tablet computer, a notebook computer, a palmtop computer, a personal computer, a smart television, a smartwatch, an in-vehicle device, a wearable device, an in-vehicle terminal, or the like, but is not limited thereto. The terminal device and the server may be directly or indirectly connected through wired or wireless communication. This is not limited in the present disclosure. The number of servers and the number of terminal devices are not limited either. The solution provided in the present disclosure may be completed independently by the terminal device, or may be completed independently by the server, or may be completed by the terminal device and the server through cooperation. This is not specifically limited in the present disclosure. In the present disclosure, the terminal device is integrated with a global navigation satellite system positioning chip for processing a satellite signal and performing accurate positioning for a user. Currently, this is widely used in location-based services. Usually, the terminal device includes a satellite positioning device, and the terminal device is capable of obtaining satellite observation values. Satellite observation values outputted by the terminal device include a pseudorange, a pseudorange rate, and an accumulated delta range (ADR). The pseudorange measures a geometric distance between the satellite and the positioning device. The pseudorange rate observation value measures Doppler effect caused by relative movement of the positioning device and the satellite. The ADR measures a variation of the geometric distance between the satellite and the positioning device.

Based on the communications system shown in FIG. 3, a specific process of the positioning method in the present disclosure may be as follows: The satellite or the CORS system transmits satellite observation data to the terminal device. The satellite observation data includes base station observation information, pseudorange observation information, carrier phase observation information, carrier-to-noise ratio observation information, and Doppler observation information. The terminal device may also be a target terminal. The target terminal may be a terminal device for performing the positioning method provided in the embodiments of the present disclosure. The terminal device determines an approximate location of the terminal device based on the satellite observation data. Then the terminal device may transmit the approximate location of the terminal device to the three-dimensional city model server based on the NTRIP protocol, and obtain three-dimensional building information based on the approximate location of the terminal device from the three-dimensional city model server. The terminal device may calculate a satellite visibility probability based on the three-dimensional building information and a satellite signal carrier-to-noise ratio of a satellite signal received by the terminal device. Finally, the terminal device determines positioning information of the terminal device based on the satellite visibility probability and the satellite signal.

Figure 4:
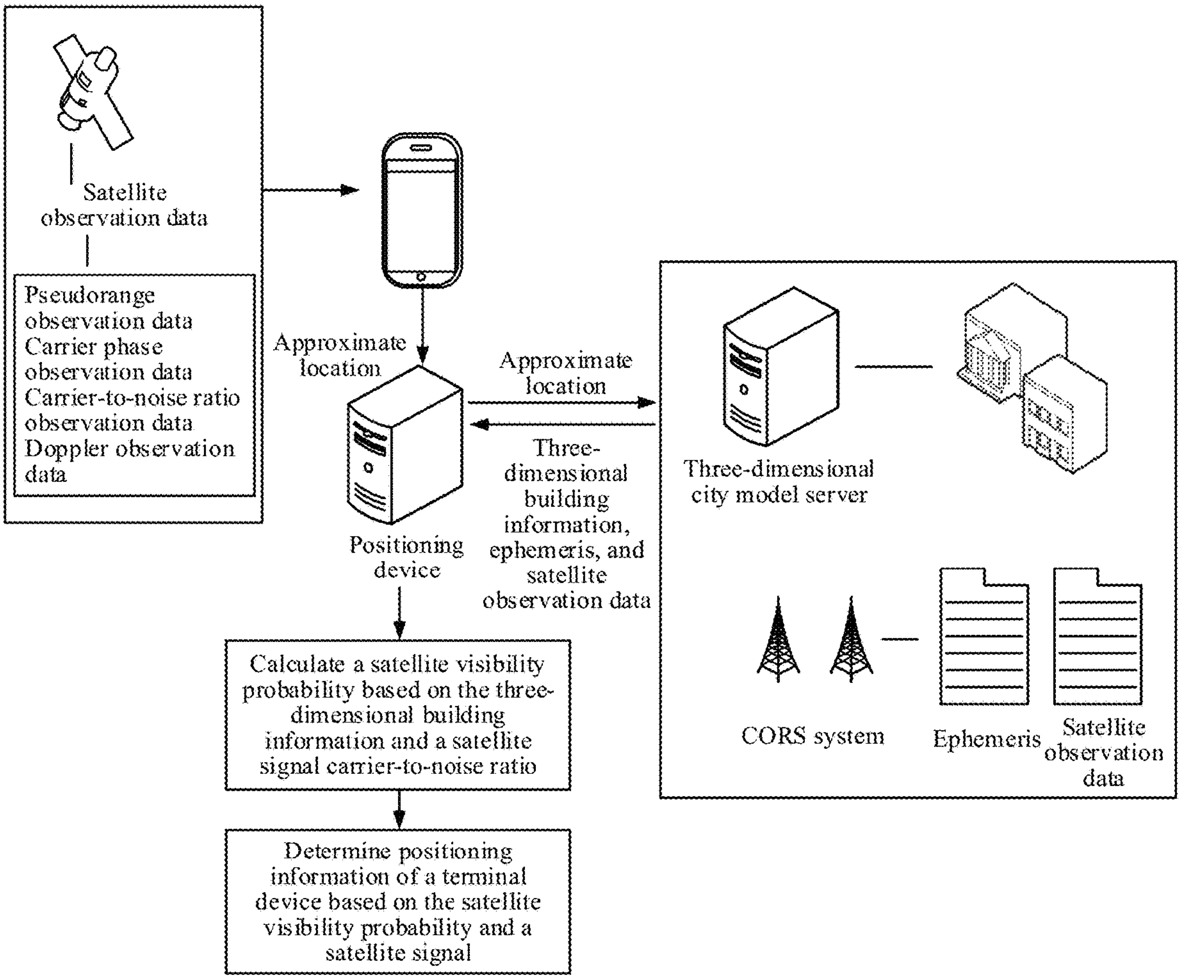
FIG. 4 is a schematic architectural diagram of a communications system according to an embodiment of the present disclosure.

It can be understood that the positioning method in the present disclosure may be further applied to a communications system shown in FIG. 4. FIG. 4 is a schematic architectural diagram of a communications system according to an embodiment of the present disclosure. As shown in the figure, the communications system includes a three-dimensional city model server, a CORS system, a target terminal, a satellite, and a positioning device, and a positioning client is deployed on the positioning device. The positioning client may run on the positioning device in a form of a browser, or may run on the positioning device in a form of an independent application (APP), or the like. A specific display form of the positioning client is not limited herein. To be specific, a computer device for performing the positioning method provided in the embodiments of the present disclosure may be independent of the target terminal, and the computer device for performing the positioning method provided in the embodiments of the present disclosure is referred to as the positioning device. The server included in the present disclosure may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The target terminal may be a smartphone, a tablet computer, a notebook computer, a palmtop computer, a personal computer, a smart television, a smartwatch, an in-vehicle device, a wearable device, an in-vehicle terminal, or the like, but is not limited thereto. The target terminal and the server may be directly or indirectly connected through wired or wireless communication. This is not limited in the present disclosure. The number of servers and the number of target terminals are not limited either. The positioning device may be another terminal device independent of the target terminal, or may be another server independent of the target terminal. The positioning device and the target terminal may be directly or indirectly connected through wired or wireless communication. The solution provided in the present disclosure may be completed by the target terminal and the positioning device through cooperation. This is not specifically limited in the present disclosure. In the present disclosure, the positioning device and the target terminal each is integrated with a global navigation satellite system positioning chip for processing a satellite signal and performing accurate positioning for a user. Currently, this is widely used in location-based services. Usually, the terminal device includes a satellite positioning device, and the terminal device is capable of obtaining satellite observation values. Satellite observation values outputted by the terminal device include a pseudorange, a pseudorange rate, and an ADR. The pseudorange measures a geometric distance between the satellite and the positioning device. The pseudorange rate observation value measures Doppler effect caused by relative movement of the positioning device and the satellite. The ADR measures a variation of the geometric distance between the satellite and the positioning device.

Based on the communications system shown in FIG. 4, a specific process of the positioning method in the present disclosure may be as follows: The satellite or the CORS system transmits satellite observation data to the target terminal. The satellite observation data includes base station observation information, pseudorange observation information, carrier phase observation information, carrier-to-noise ratio observation information, and Doppler observation information. The target terminal determines an approximate location of the target terminal based on the satellite observation data, and then the target terminal transmits the approximate location to the positioning device. Then the positioning device may transmit the approximate location of the terminal device to the three-dimensional city model server based on the NTRIP protocol, and obtain three-dimensional building information based on the approximate location of the target terminal from the three-dimensional city model server. The positioning device calculates a satellite visibility probability based on the three-dimensional building information and a satellite signal carrier-to-noise ratio of a satellite signal received by the target terminal. Finally, the positioning device determines positioning information of the target terminal based on the satellite visibility probability and the satellite signal, and the positioning device transmits the positioning information of the target terminal to the target terminal.

It can be understood that, in a case that the positioning method is applied to a positioning device independent of a target terminal, the positioning device may alternatively directly receive an approximate location, three-dimensional building information, an ephemeris, and satellite observation data that are transmitted by the terminal device. That is, a specific implementation is not limited herein, provided that positioning of the target terminal can be implemented.

Figure 5:
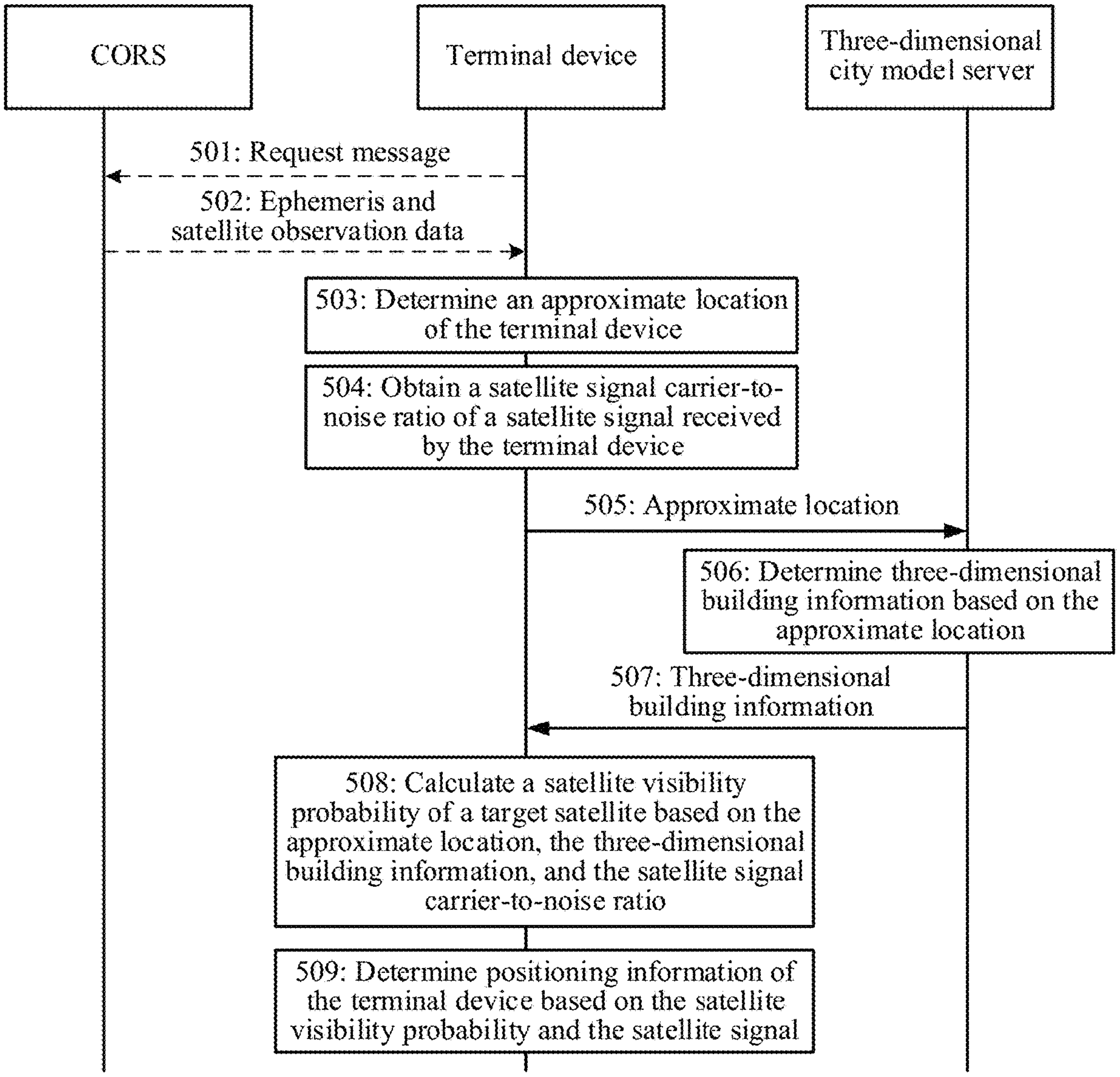
FIG. 5 is a schematic diagram of an embodiment of a positioning method according to an embodiment of the present disclosure.

With reference to the foregoing descriptions, the positioning method in the present disclosure is described below. For details, refer to FIG. 5. In this embodiment, an example in which a target terminal is a positioning execution entity is used for description. The target terminal is represented by a terminal device below. An embodiment of the positioning method in the present disclosure includes the following steps:

503: The terminal device determines an approximate location of the terminal device.

The approximate location may be determined in many manners. In one embodiment, the terminal device may obtain an ephemeris and satellite observation data that are transmitted by a CORS, the satellite observation data being satellite observation data relative to a target terminal; and then obtain the approximate location based on the ephemeris and the satellite observation data. In this embodiment, the ephemeris is a precise location or trajectory table of movement of a celestial body over time during GPS measurement, and is a function of time. Ephemerides are classified into a “broadcast ephemeris” and a post-processed “precision ephemeris” in specific application. The satellite observation data may include base station observation information, pseudorange observation information, carrier phase observation information, carrier-to-noise ratio observation information, and Doppler observation information.

In this implementation, the terminal device transmits a request message to the CORS system, the request message being used for requesting the CORS system to broadcast an ephemeris and satellite observation data (as indicated by 501 in FIG. 5), to request an ephemeris and satellite observation data of a current positioning satellite from the CORS system. After receiving the request message from the terminal device, the CORS system transmits a current ephemeris and current satellite observation data to the terminal device, in other words, the terminal device receives the ephemeris and the satellite observation data that are transmitted by the CORS system (as indicated by 502 in FIG. 5).

In the foregoing method, the approximate location of the target terminal can be obtained more directly. This improves convenience of positioning.

In another embodiment, a manner of determining, by the terminal device, the approximate location of the terminal device may be: obtaining an ephemeris and satellite observation data that are transmitted by a target terminal, the satellite observation data being satellite observation data relative to the target terminal; and then obtaining the approximate location based on the ephemeris and the satellite observation data.

In the foregoing method, another positioning device is used for implementing a positioning process. This avoids a hardware limitation in the case of positioning by the terminal device, and can increase a calculation speed during positioning.

After the terminal device obtains the ephemeris and the satellite observation data, an implementation of obtaining, by the terminal device, the approximate location based on the ephemeris and the satellite observation data may be: calculating the approximate location based on the ephemeris and a pseudorange observation value in the satellite observation data by using a least square method.

It can be understood that the approximate location may also be understood as initial positioning information determined by the terminal device based on the ephemeris and the satellite observation data. For example, an actual current location of the terminal device is A, and the approximate location is that the terminal is at a location B, a distance between the location B and the location A being M meters.

504: The terminal device obtains a satellite signal carrier-to-noise ratio of a satellite signal received by the terminal device.

In this embodiment, the carrier-to-noise ratio (signal-to-noise ratio) is a standard measurement scale for indicating a relationship between a carrier and carrier noise, and is usually denoted as CNR or C/N (dB). A higher carrier-to-noise ratio provides a higher network reception rate, better network communication quality, and higher network reliability. In the carrier-to-noise ratio, power of the carrier is represented by Pc, and power of the noise is represented by Pn. In this case, a decibel unit formula of the carrier-to-noise ratio is expressed as follows: $C/N=10\ \lg(Pc/Pn)$. Similar to the signal-to-noise ratio, the carrier-to-noise ratio is a scale representing quality of a network channel. However, the signal-to-noise ratio is usually used in practical application, and the carrier-to-noise ratio is used in a satellite communications system. An optimal antenna arrangement can achieve an optimal carrier-to-noise ratio.

It can be learned from the foregoing descriptions that after receiving a satellite signal transmitted by a navigation satellite, the terminal device may obtain a satellite signal carrier-to-noise ratio of the satellite signal based on carrier power of the satellite signal and inter-noise power of the satellite signal.

505: The terminal device transmits the approximate location to a three-dimensional city model server.

The terminal device transmits the approximate location to the three-dimensional city model server based on the NTRIP protocol or another possible communications protocol.

It can be understood that the three-dimensional city model is a three-dimensional model produced based on two-dimensional geographic information, and has developed into a three-dimensional geographic information system through program development. Natural elements and construction elements of a city may be analyzed by using the system. A user obtains real and intuitive experience with a virtual urban environment through interactive operations. The three-dimensional city model server in this embodiment may also be understood as a three-dimensional city model database.

506: The three-dimensional city model server determines three-dimensional building information based on the approximate location.

Figure 6:
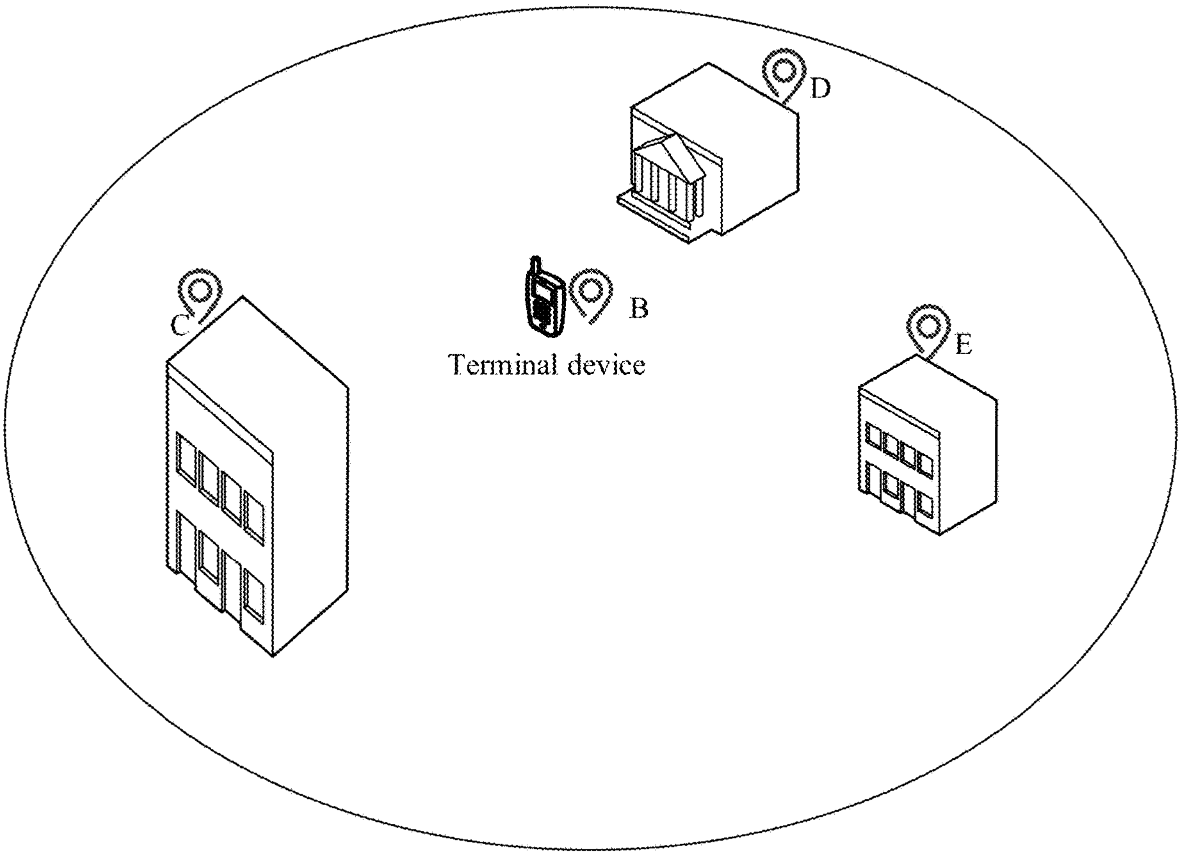
FIG. 6 is a schematic diagram of a scenario of three-dimensional building information according to an embodiment of the present disclosure.

After obtaining the approximate location of the terminal device, the three-dimensional city model server finds a region to which the approximate location belongs from a database, and then obtains three-dimensional building information of each building near the approximate location. It can be understood that the three-dimensional building information includes coordinates, a length, a width, a height, an area, a volume, an azimuth, a slope, a turning radius, and other information of each building. As shown in FIG. 6, the approximate location of the terminal device is B, and the three-dimensional city model server finds surrounding buildings C, D, and E based on the location B. In this case, the three-dimensional building information includes three-dimensional information of the building C, the building D, and the building E.

507: The terminal device receives the three-dimensional building information transmitted by the three-dimensional city model server.

After obtaining the three-dimensional building information based on the approximate location of the terminal device, the three-dimensional city model server feeds back the three-dimensional building information to the terminal device.

508: The terminal device calculates a satellite visibility probability of a target satellite based on the approximate location, the three-dimensional building information, and the satellite signal carrier-to-noise ratio, the target satellite being a corresponding satellite from which the terminal device receives the satellite signal, and the satellite visibility probability indicating a probability that the target satellite is in a visible state relative to the terminal device.

The terminal device may receive satellite signals from a plurality of navigation satellites. Therefore, in this embodiment, the terminal device may calculate satellite visibility probabilities of the satellites based on approximate locations and three-dimensional building information of the satellites and satellite signal carrier-to-noise ratios of the plurality of satellites.

In one embodiment, the terminal device may calculate the satellite visibility probability of the target satellite based on the approximate location, the three-dimensional building information, and the satellite signal carrier-to-noise ratio by using the following technical solution:

The terminal device calculates satellite visibility distribution information based on the three-dimensional building information and the approximate location, the satellite visibility distribution information indicating a visibility status of a corresponding satellite from which the terminal device is capable of receiving a satellite signal. Then the terminal device calculates the satellite visibility probability based on the satellite signal carrier-to-noise ratio and the satellite visibility distribution information.

The visibility distribution information is calculated based on the three-dimensional building information, and then the satellite visibility probability is calculated based on the visibility distribution information and the satellite signal carrier-to-noise ratio. This improves calculation accuracy of the satellite visibility probability and therefore improves reliability of data processing.

In one embodiment, the terminal device may specifically calculate the satellite visibility distribution information based on the three-dimensional building information and the approximate location by using the following exemplary solution:

in response to determining, based on the three-dimensional building information, that no building is blocking at the azimuth, determining that the target satellite is in a visible state relative to the target terminal; or in response to determining, based on the three-dimensional building information, that a building is blocking at the azimuth, calculating an intersection point K between the building and the target terminal and coordinate information of the intersection point K based on the three-dimensional building information and the azimuth; calculating an elevation of the target satellite relative to the intersection point K based on the coordinate information of the intersection point K; and in a case that the elevation of the target satellite relative to the target terminal is less than or equal to the elevation of the target satellite relative to the intersection point K, determining that the target satellite is in an invisible state relative to the target terminal; or in a case that the elevation of the target satellite relative to the target terminal is greater than the elevation of the target satellite relative to the intersection point K, determining that the target satellite is in a visible state relative to the target terminal. It can be understood that, in addition to the elevation relative to the intersection point K, an azimuth of the target satellite relative to the intersection point K may be further calculated based on the coordinate information of the intersection point K.

In the foregoing method, the visibility status of the satellite to which the target terminal is connected is determined based on the approximate location of the target terminal, to implement classification of accuracy of the satellite signal and improve positioning accuracy for the target terminal.

In one embodiment, the terminal device may calculate the satellite visibility probability based on the satellite visibility distribution information and the satellite signal carrier-to-noise ratio by using the following technical solution:

The terminal device obtains visibility state values of N satellites based on the satellite visibility distribution information, a value of N being the number of satellites to which the target terminal is connected; calculates carrier-to-noise ratio state values of the N satellites based on the satellite signal carrier-to-noise ratios; and calculates satellite visibility probabilities of the N satellites based on visibility information of the N satellites and the carrier-to-noise ratio state values of the N satellites.

In the foregoing method, a process of calculating the satellite visibility probability based on the satellite visibility distribution information is added. This improves feasibility of the entire solution.

In an exemplary scenario, the terminal device may calculate the satellite visibility distribution information as follows:

It is assumed that an Earth-centered, Earth-fixed (ECEF) coordinate of the terminal device i is $r_i$ and an ECEF coordinate of a corresponding satellite j from which the terminal device i receives a satellite signal is $r^j$. In this case, an elevation and an azimuth of the satellite j relative to the terminal device i may be calculated based on the following formula (1), formula (2), and formula (3):

$$\theta_i^j = \arcsin\left(\frac{\Delta u_i^j}{\sqrt{\Delta e_i^{j2} + \Delta n_i^{j2} + \Delta u_i^{j2}}}\right) \tag{1}$$

$$\alpha_i^j = \arctan\left(\frac{\Delta e_i^j}{\Delta n_i^j}\right) \tag{2}$$

$$\begin{pmatrix}\Delta e_i^j \\ \Delta n_i^j \\ \Delta u_i^j\end{pmatrix} = \begin{pmatrix} -\sin\lambda_i & \cos\lambda_i & 0 \\ -\sin\phi_i\cos\lambda_i & -\sin\phi_i\sin\lambda_i & \cos\phi_i \\ \cos\phi_i\cos\lambda_i & \cos\phi_i\sin\lambda_i & \sin\phi_i \end{pmatrix} \cdot (r^j - r_i) \tag{3}$$

$$\theta_i^j$$

is the elevation of the satellite j relative to the terminal device i, and $$\alpha_i^j$$

is the azimuth of the satellite j relative to the terminal device i. After the elevation and the azimuth of the terminal device relative to the satellite are obtained, based on the approximate location of the terminal device and the three-dimensional building information based on the approximate location of the terminal device, the satellite j is in a visible state relative to the terminal device in a case that the terminal device is not blocked by any building at the azimuth $$\alpha_i^j.$$

Figure 7:
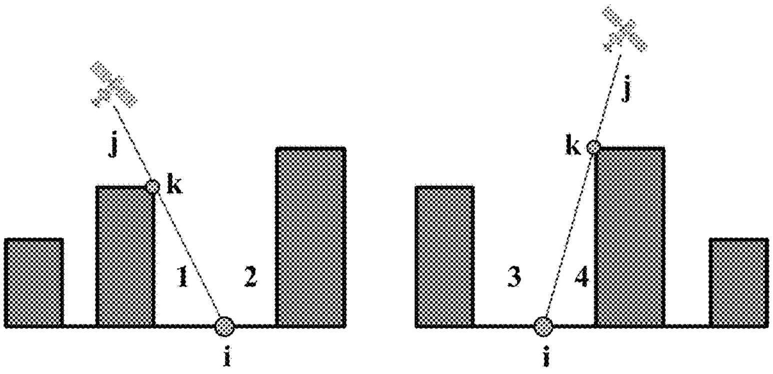
FIG. 7 is a schematic diagram of a scenario of three-dimensional building information and a location of a terminal device according to an embodiment of the present disclosure.

In a case that the terminal device is blocked by a building at the azimuth $$\alpha_i^j,$$

a three-dimensional model of the building is determined based on the three-dimensional building information, and an intersection point K between a highest edge of the building and a ray of the terminal device at the azimuth $$\alpha_i^j$$

is calculated based on the three-dimensional model of the building, as shown in FIG. 7. Assuming that a coordinate of the intersection point K is $r_k$, an elevation and an azimuth of the satellite j relative to the intersection point K are calculated based on the following formula (4), formula (5), and formula (6):

$$\theta_k^j = \arcsin\left(\frac{\Delta u_k^j}{\sqrt{\Delta e_k^{j2} + \Delta n_k^{j2} + \Delta u_k^{j2}}}\right) \tag{4}$$

$$\alpha_k^j = \arctan\left(\frac{\Delta e_k^j}{\Delta n_k^j}\right) \tag{5}$$

-continued $$\begin{pmatrix} \Delta e_k^j \\ \Delta n_k^j \\ \Delta u_k^j \end{pmatrix} = \begin{pmatrix} -\sin\lambda_k & \cos\lambda_k & 0 \\ -\sin\phi_k\cos\lambda_k & -\sin\phi_k\sin\lambda_k & \cos\phi_k \\ \cos\phi_k\cos\lambda_k & \cos\phi_k\sin\lambda_k & \sin\phi_k \end{pmatrix} \cdot (r^j - r_k) \quad (6)$$

In the formulas, $$\theta_k^j$$

is the elevation of the satellite j relative to the intersection point K, $$\alpha_k^j$$

is the azimuth of the satellite j relative to the intersection point K, and $$\alpha_k^j = \alpha_i^j.$$

As shown in FIG. 7, a point K is an intersection point between the highest edge of the building and the ray of the terminal device at the azimuth $$\alpha_i^j,$$

i and j are the terminal device and the satellite, 2 and 3 are visibility regions, and 1 and 4 are invisibility regions.

In the case of $$\theta_k^j < \theta_i^j,$$

the satellite j is visible to the terminal device i.

In the case of $$\theta_k^j \geq \theta_i^j,$$

the satellite j is invisible to the terminal device i.

Figure 8:
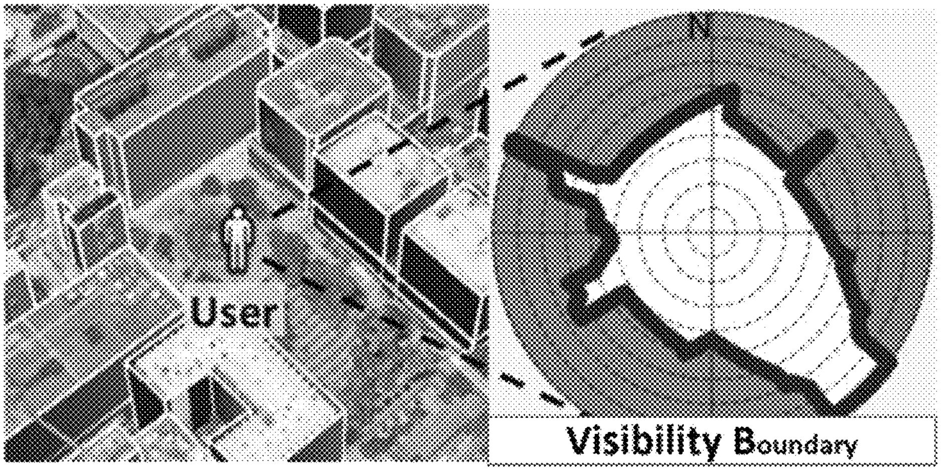
FIG. 8 is a schematic diagram of an embodiment of satellite visibility distribution information according to an embodiment of the present disclosure.
Figure 9:
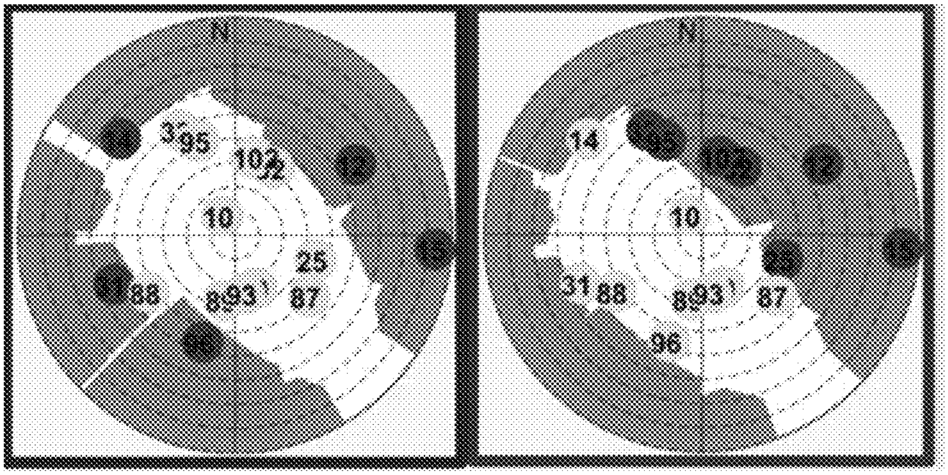
FIG. 9 is a schematic diagram of another embodiment of satellite visibility distribution information according to an embodiment of the present disclosure.

Preliminary satellite visibility distribution information may be obtained by performing the foregoing processing on all satellites from which the terminal device receives satellite signals. Satellite visibility distribution information with the terminal device as a center location may be obtained in the foregoing steps, as shown in FIG. 8 and FIG. 9. In a case that a satellite is located in a white region in a diagram on the right of FIG. 8, the satellite is visible. In a case that a satellite is located in a shaded region in the diagram on the right of FIG. 8, the satellite is invisible. A black line represents a boundary line of a visibility region of the satellite. In FIG. 9, light gray satellites (for example, satellites indicated by 14, 88, 31, 10, and 93 on the right of FIG. 9) represent visible satellites, and dark gray satellites (for example, satellites indicated by 12, 15, 25, and 95 on the right of FIG. 9) represent invisible satellites.

Assuming that the terminal device receives satellite signals from N satellites, visibility information of the N satellites may be calculated through the foregoing steps as follows:

$$\Omega = \{\tau_i^1, \tau_i^2, \tau_i^3, \ldots, \tau_i^N\},$$

where $$\begin{cases} \tau_i^j = 1, & \text{visibility} \\ \tau_i^j = 0, & \text{invisibility} \end{cases}.$$

In addition, it is assumed that carrier-to-noise ratios of N satellite signals are as follows:

$$\Phi = \{CNR_i^1, CNR_i^2, CNR_i^3, \ldots, CNR_i^N\}.$$

In this case, a satellite visibility probability $$p_i^j$$

may be calculated based on the visibility information Ω and the carrier-to-noise ratios Φ of the N satellites.

$$p_i^j = p(CNR_i^j) \cdot p(\tau_i^j) + (1 - p(CNR_i^j)) \cdot (1 - p(\tau_i^j)), \text{ where}$$

$$p(\tau_i^j) = \begin{cases} c, & \tau_i^j = 0 \\ d, & \tau_i^j = 1 \end{cases}, \ j = 1, 2, \ldots, N; \text{ and}$$

$$p(CNR_i^j) = \begin{cases} p_{min}, & CNR_i^j < s_{min} \\ a_2 \cdot (CNR_i^j)^2 + a_1 \cdot CNR_i^j + a_0, & s_{min} < CNR_i^j < s_{max} \\ p_{min}, & CNR_i^j > s_{max} \end{cases}, \ j = 1, 2, \ldots, N.$$

$$\tau_i^1 \text{ to } \tau_i^N$$

are used for indicating visibility information of N target satellites, and a value is 1 in the case of a visible state, or a value is 0 in the case of an invisible state.

$$CNR_i^1 \text{ to } CNR_i^N$$

are used for indicating satellite signal carrier-to-noise ratios of the N target satellites. $\alpha_0$, $\alpha_1$, $\alpha_2$, c, d, $s_{min}$, and $s_{max}$ are known constants.

It can be understood that, in this embodiment, time at which the three-dimensional building information and the satellite signal carrier-to-noise ratio are obtained is not limited. To be specific, an action of measuring the satellite signal carrier-to-noise ratio may be performed while an action of obtaining the three-dimensional building information is performed; or an action of measuring the satellite signal carrier-to-noise ratio may be performed after an action of obtaining the three-dimensional building information is performed; or an action of measuring the satellite signal carrier-to-noise ratio may be performed before an action of obtaining the three-dimensional building information is performed. A specific case is not limited herein, provided that the terminal device can obtain the three-dimensional building information and the satellite signal carrier-to-noise ratio.

509: The terminal device determines positioning information of the terminal device based on the satellite visibility probability and the satellite signal.

In this embodiment, after obtaining the satellite visibility probability, the terminal device may calculate final positioning information of the target terminal based on the satellite visibility probability and the satellite signal. The positioning information may include a longitude, a latitude, and an altitude of a location of the terminal device.

In one embodiment, in view of characteristics of the RTK differential positioning technology, to further improve positioning accuracy, an implementation of 509 in this embodiment of the present disclosure may be: calculating the positioning information of the target terminal through RTK differential positioning based on the satellite visibility probability and the satellite signal, to determine the positioning information of the terminal device by integrating the satellite visibility probability and the RTK differential positioning technology. This further improves positioning accuracy in a scenario in which a satellite signal is seriously blocked and significant multi-path effect occurs.

In an exemplary solution, a specific process of determining, by the terminal device, the positioning information of the terminal device through RTK differential positioning by integrating the satellite visibility probability and the satellite signal may be as follows:

The terminal device calculates a satellite observation weight matrix based on the satellite visibility probability and the satellite signal carrier-to-noise ratio, and constructs an RTK differential equation based on the satellite signal. Then the terminal device performs calculation on the satellite observation weight matrix and the RTK differential equation by using a Gauss-Newton iteration method to obtain the positioning information of the terminal device.

In the foregoing method, the satellite observation weight matrix and the RTK differential equation are constructed, and calculation is performed on the satellite observation weight matrix and the RTK differential equation by using the Gauss-Newton iteration method, to improve accuracy and reliability of the positioning information of the target terminal.

It can be understood that an exemplary solution for calculating, by the terminal device, the satellite observation weight matrix based on the satellite visibility probability and the satellite signal carrier-to-noise ratio may be as follows:

The terminal device constructs a terminal pseudorange observation weight matrix and a terminal carrier phase observation weight matrix based on the satellite visibility probability and the satellite signal carrier-to-noise ratio, the terminal pseudorange observation weight matrix and the terminal carrier phase observation weight matrix being used as the satellite observation weight matrix. The terminal pseudorange observation weight matrix is as follows:

$$W_{\rho_i} = \begin{bmatrix} 3^2 \cdot \frac{10^{\frac{53-CNR_i^1}{10}}}{\sin^2 el^1} \cdot p_i^1 & \cdots & 0 \\ \vdots & \ddots & \vdots \\ 0 & \cdots & 3^2 \cdot \frac{10^{\frac{53-CNR_i^N}{10}}}{\sin^2 el^1} \cdot p_i^N \end{bmatrix}.$$

The terminal carrier phase observation weight matrix is as follows:

$$W_{\varphi_i} = \begin{bmatrix} 0.01^2 \cdot \frac{10^{\frac{53-CNR_i^1}{10}}}{\sin^2 el^1} \cdot p_i^1 & \cdots & 0 \\ \vdots & \ddots & \vdots \\ 0 & \cdots & 0.01^2 \cdot \frac{10^{\frac{53-CNR_i^N}{10}}}{\sin^2 el^1} \cdot p_i^N \end{bmatrix}.$$

$W_{\rho i}$ is used for indicating the terminal pseudorange observation weight matrix. $W_{\varphi i}$; is used for indicating the terminal carrier phase observation weight matrix.

$$CNR_i^1 \text{ to } CNR_i^N$$

are used for indicating the satellite signal carrier-to-noise ratios of the N target satellites.

$$p_i^1 \text{ and } p_i^N$$

are used for indicating the satellite visibility probability. N is used for indicating the number of satellites from which the target terminal is capable of receiving a satellite signal, and N is a positive integer.

The foregoing method provides a specific implementation of the satellite observation weight matrix, to improve feasibility and operability of the solution.

It can be understood that the terminal device may further construct a base station pseudorange observation weight matrix and a base station carrier phase observation weight matrix. A specific manner is similar to the foregoing solution. Details are not described herein again.

It can be understood that, in some cases, the satellite data may include a pseudorange between the target terminal and a satellite and a carrier phase observation value between the target terminal and the satellite. In this case, a specific process of constructing, by the terminal device, the RTK differential equation based on the satellite signal may be as follows: The terminal device constructs an RTK differential positioning constraint equation based on the pseudorange between the terminal device and the satellite and the carrier phase observation value between the terminal device and the satellite; and then constructs an RTK differential constraint modification equation based on the RTK differential positioning constraint equation, the RTK differential positioning constraint equation and the RTK differential constraint modification equation being used as the RTK differential equation. The RTK differential positioning constraint equation is as follows:

$$z_{\rho i}=\begin{bmatrix}\rho_{ib}^{12}\\ \rho_{ib}^{13}\\ \vdots\\ \rho_{ib}^{1N}\end{bmatrix}-\begin{bmatrix}r_i^1-r_i^2-(r_b^1-r_b^2)+I_{ib}^{12}+T_{ib}^{12}\\ r_i^1-r_i^3-(r_b^1-r_b^3)+I_{ib}^{13}+T_{ib}^{13}\\ \vdots\\ r_i^1-r_i^N-(r_b^1-r_b^N)+I_{ib}^{12}+T_{ib}^{1N}\end{bmatrix};\text{ and}$$

$$z_{\varphi i}=\begin{bmatrix}\varphi_{ib}^{12}\\ \varphi_{ib}^{13}\\ \vdots\\ \varphi_{ib}^{1N}\end{bmatrix}-\begin{bmatrix}r_i^1-r_i^2-(r_b^1-r_b^2)+I_{ib}^{12}+T_{ib}^{12}+\lambda B_{ib}^{12}\\ r_i^1-r_i^3-(r_b^1-r_b^3)+I_{ib}^{13}+T_{ib}^{13}+\lambda B_{ib}^{13}\\ \vdots\\ r_i^1-r_i^N-(r_b^1-r_b^N)+I_{ib}^{1N}+T_{ib}^{1N}+\lambda B_{ib}^{1N}\end{bmatrix}.$$

$$r_i^j,\ i=1,2,\ \dots\ ,N$$

represents a geometric distance between the terminal device and a satellite j.

$$\rho_{ib}^{12}=\rho_i^1-\rho_i^2-(\rho_b^1-\rho_b^2),\ \varphi_{ib}^{12}=\varphi_i^1-\varphi_i^2-(\varphi_b^1-\varphi_b^2),$$

and so on.

$$I_{ib}^{12},\ I_{ib}^{13},\ \dots\ ,\ I_{ib}^{1N}$$

are double-difference ionospheric delays.

$$T_{ib}^{12},\ T_{ib}^{13},\ \dots\ ,\ T_{ib}^{1N}$$

are double-difference tropospheric delays. A satellite 1 is a reference satellite.

$$B_{ib}^{12},\ B_{ib}^{13},\ \dots\ ,\ B_{ib}^{1N}$$

are constants. λ is a wavelength of a satellite signal transmitted by a satellite.

$$\rho_{ib}^{12},\ \rho_{ib}^{13},\ \dots\ ,\ \rho_{ib}^{1N}$$

are used for indicating pseudoranges between the terminal device and satellites.

$$\varphi_{ib}^{12},\ \varphi_{ib}^{13},\ \dots\ ,\ \varphi_{ib}^{1N}$$

indicate carrier phase observation values between the terminal device and the satellites.

The RTK differential constraint modification equation is as follows:

$$\begin{bmatrix}z_{\rho i}\\ z_{\varphi i}\end{bmatrix}=H_i\cdot\delta x.$$

$H_i$ is a Jacobian matrix. δx is a modified matrix.

$$H_i=\begin{bmatrix}-(e_i^1-e_i^2) & 0 & 0 & 0 & 0 & 0 & 0 & 0 & 0\\ -(e_i^1-e_i^3) & 0 & 0 & 0 & 0 & 0 & 0 & 0 & 0\\ \vdots & 0 & 0 & 0 & 0 & 0 & 0 & 0 & 0\\ -(e_i^1-e_i^n) & 0 & 0 & 0 & 0 & 0 & 0 & 0 & 0\\ -(e_i^1-e_i^2) & 0 & 0 & 0 & 0 & \lambda & 0 & 0 & 0\\ -(e_i^1-e_i^3) & 0 & 0 & 0 & 0 & 0 & \lambda & 0 & 0\\ \vdots & 0 & 0 & 0 & 0 & 0 & 0 & \lambda & 0\\ -(e_i^1-e_i^n) & 0 & 0 & 0 & 0 & 0 & 0 & 0 & \lambda\end{bmatrix},\ \delta x=\begin{bmatrix}\delta r\\ B_{ib}^{12}\\ B_{ib}^{13}\\ \vdots\\ B_{ib}^{1N}\end{bmatrix}.$$

$$e_i^j,\ j=1,2,\ \dots\ ,n$$

is a unit observation vector between the terminal device and the satellite. λ is a wavelength of a satellite signal transmitted by the satellite. δr and $$B_{ib}^{12},\ B_{ib}^{13},\ \dots\ ,\ B_{ib}^{1N}$$

are constants for indicating modification amounts.

The foregoing method provides a specific implementation of the RTK differential method, to improve feasibility and operability of the solution.

In this solution, a specific process of performing, by the terminal device, calculation on the satellite observation weight matrix and the RTK differential equation by using the Gauss-Newton iteration method to obtain the positioning information may be as follows:

The terminal device determines an estimated parameter modification amount equation based on the satellite observation weight matrix and the RTK differential equation, and obtains an initial estimated parameter; and then iteratively calculates an estimated parameter modification amount by using the Gauss-Newton iteration method and the estimated parameter modification amount equation. In a case that the estimated parameter modification amount meets a preset condition, the terminal device updates the initial estimated parameter based on the estimated parameter modification amount to obtain a target estimated parameter, and outputs the target estimated parameter, the target estimated parameter being used as the positioning information of the terminal device.

The foregoing method provides an update iteration process of the Gauss-Newton iteration method, to improve feasibility and operability of the solution.

In some cases, the satellite observation weight matrix may include a terminal pseudorange observation weight matrix and a terminal carrier phase observation weight matrix. In this case, a manner of determining the estimated parameter modification amount equation based on the satellite observation weight matrix and the RTK differential equation may be: determining the estimated parameter modification amount equation based on the terminal pseudorange observation weight matrix, the terminal carrier phase observation weight matrix, and the RTK differential equation. In the foregoing descriptions, the RTK differential equation may include the RTK differential positioning constraint equation and the RTK differential constraint modification equation. Correspondingly, a manner of determining the estimated parameter modification amount equation may be: determining the estimated parameter modification amount equation based on the terminal pseudorange observation weight matrix, the terminal carrier phase observation weight matrix, the RTK differential positioning constraint equation, and the RTK differential constraint modification equation.

The estimated parameter modification amount equation is as follows:

$$\Delta x_k = -\left(H_{ik}^T \begin{bmatrix} W_{\rho_i} & 0 \\ 0 & W_{\varphi_i} \end{bmatrix} H_{ik}\right)^{-1} H_{ik}^T W_k \begin{bmatrix} z_{\rho i} \\ z_{\varphi i} \end{bmatrix}.$$

$\Delta x_k$ is used for indicating the estimated parameter modification amount. $H_{ik}$ is used for indicating a Jacobian matrix. T is used for indicating to transpose the Jacobian matrix. $W_{\rho i}$ is used for indicating the terminal pseudorange observation weight matrix. $W_{\varphi i}$ is used for indicating the terminal carrier phase observation weight matrix.

$$\begin{bmatrix} z_{\rho i} \\ z_{\varphi i} \end{bmatrix}$$

is used for indicating the RTK differential constraint modification equation. $z_{\rho i}$ and $z_{\varphi i}$ are used for indicating the RTK differential positioning constraint equation.

The foregoing method provides a specific manner of constructing the estimated parameter modification amount equation, to improve feasibility of the solution.

In this embodiment, a process of updating the initial estimated parameter based on the estimated parameter modification amount may be: adding the estimated parameter modification amount to a previous estimated parameter to obtain a next estimated parameter. A specific manner may be as follows: $x_{k+1}=x_k+\Delta x_k$.

$\Delta x_k$ is used for indicating an estimated parameter modification amount obtained through a $K^{th}$ iteration. $x_k$ is used for indicating an estimated parameter obtained through a $K^{th}$ update. $x_{k+1}$ is used for indicating an estimated parameter obtained through a $(K+1)^{th}$ update.

A preset condition that the estimated parameter needs to meet may be as follows: $\|\Delta x_{\rho,k}\|<10^{-4}$. To be specific, a difference between an estimated parameter obtained at $\rho^{th}$ time and an estimated parameter obtained at $K^{th}$ time needs to be less than $10^{-4}$. This may also be understood as that an estimated parameter obtained through a next iterative update is output in a case that an estimated parameter modification amount obtained through an update iteration is less than $10^{-4}$. For example, an estimated parameter obtained through an $(n+1)^{th}$ update is output in a case that an estimated parameter modification amount obtained through an $n^{th}$ update is less than $10^{-4}$.

The foregoing method provides a specific implementation of iteratively updating the estimated parameter, to improve feasibility and operability of the solution.

It can be understood that, in this embodiment, the terminal device may further transmit the positioning information to the CORS system and the three-dimensional city model server after determining the positioning information, so that the CORS system and the three-dimensional city model server update location information of the terminal device, to optimize the positioning information.

It can be learned from the foregoing technical solutions that the embodiments of the present disclosure have the following advantages: After obtaining an approximate location of a target terminal to be positioned, a positioning apparatus obtains three-dimensional building information of an environment in which the target terminal is located; determines a satellite visibility probability based on the three-dimensional building information and a carrier-to-noise ratio of a satellite signal received by the target terminal, that is, determines whether blocking occurs between the target terminal and a satellite, to indicate accuracy of the satellite signal; and finally, calculates final positioning information of the target terminal based on the satellite visibility probability and the satellite signal. In this way, the received satellite signal can be corrected based on the satellite visibility probability. This improves accuracy of positioning the target terminal based on the satellite signal in a scenario in which the satellite signal is seriously blocked and significant multi-path effect occurs.

Figure 10:
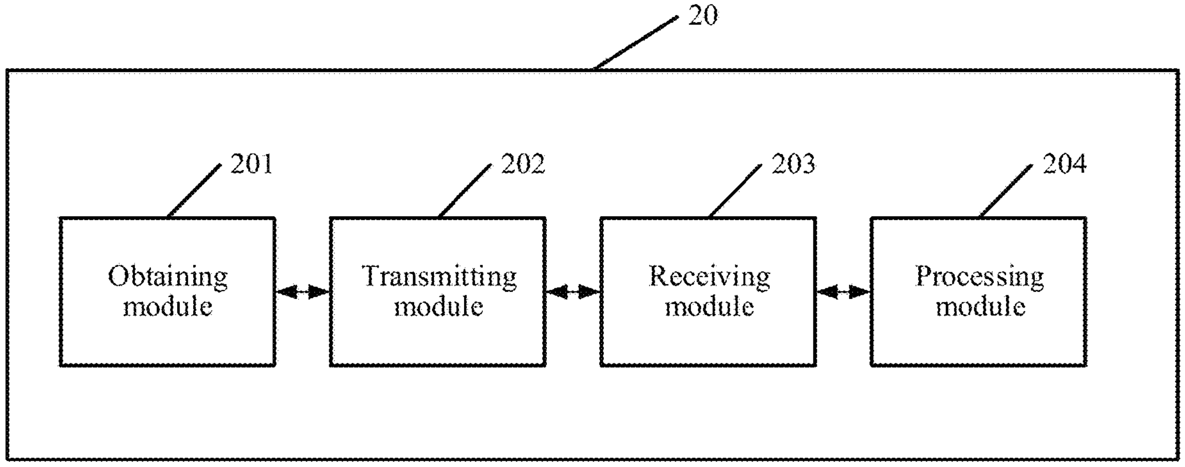
FIG. 10 is a schematic diagram of an embodiment of a positioning apparatus according to an embodiment of the present disclosure.

A positioning apparatus in the present disclosure is described in detail below. FIG. 10 is a schematic diagram of an embodiment of a positioning apparatus according to an embodiment of the present disclosure. The positioning apparatus 20 includes:

an obtaining module 201, configured to obtain an approximate location of a target terminal to be positioned, and obtain a satellite signal carrier-to-noise ratio of a satellite signal received by the target terminal;

a transmitting module 202, configured to transmit the approximate location to a three-dimensional city model server;

a receiving module 203, configured to receive three-dimensional building information transmitted by the three-dimensional city model server, the three-dimensional building information being calculated by the three-dimensional city model server based on the approximate location; and a processing module 204, configured to: calculate a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal; and calculate positioning information of the target terminal based on the satellite visibility probability and the satellite signal.

In this embodiment of the present disclosure, a positioning apparatus is provided. After obtaining an approximate location of a target terminal to be positioned, the foregoing apparatus obtains three-dimensional building information of an environment in which the target terminal is located; determines a satellite visibility probability based on the three-dimensional building information and a carrier-to-noise ratio of a satellite signal received by the target terminal, that is, determines whether blocking occurs between the target terminal and a satellite, to indicate accuracy of the satellite signal; and finally, calculates final positioning information of the target terminal based on the satellite visibility probability and the satellite signal. In this way, the received satellite signal can be corrected based on the satellite visibility probability. This improves accuracy of positioning the target terminal based on the satellite signal in a scenario in which the satellite signal is seriously blocked and significant multi-path effect occurs.

In one embodiment, based on the embodiment corresponding to FIG. 10, in another embodiment of the positioning apparatus 20 provided in this embodiment of the present disclosure, the processing module 204 is specifically configured to: calculate satellite visibility distribution information based on the three-dimensional building information and the approximate location, the satellite visibility distribution information indicating a visibility status of a corresponding satellite from which the target terminal is capable of receiving a satellite signal; and calculate the satellite visibility probability based on the satellite signal carrier-to-noise ratio and the satellite visibility distribution information.

In this embodiment of the present disclosure, a positioning apparatus is provided. The foregoing apparatus calculates the visibility distribution information based on the three-dimensional building information, and then calculates the satellite visibility probability based on the visibility distribution information and the satellite signal carrier-to-noise ratio. This improves calculation accuracy of the satellite visibility probability and therefore improves reliability of data processing.

In one embodiment, based on the embodiment corresponding to FIG. 10, in another embodiment of the positioning apparatus 20 provided in this embodiment of the present disclosure, the processing module 204 is specifically configured to: determine an elevation and an azimuth of the target satellite relative to the target terminal based on the approximate location and a location of the target satellite; and in response to determining, based on the three-dimensional building information, that no building is blocking at the azimuth, determine that the target satellite is in a visible state relative to the target terminal; or in response to determining, based on the three-dimensional building information, that a building is blocking at the azimuth, calculate an intersection point K between the building and the target terminal and coordinate information of the intersection point K based on the three-dimensional building information and the azimuth;

calculate an elevation of the target satellite relative to the intersection point K based on the coordinate information of the intersection point K; and in a case that the elevation of the target satellite relative to the target terminal is less than or equal to the elevation of the target satellite relative to the intersection point K, determine that the target satellite is in an invisible state relative to the target terminal; or in a case that the elevation of the target satellite relative to the target terminal is greater than the elevation of the target satellite relative to the intersection point K, determine that the target satellite is in a visible state relative to the target terminal.

In this embodiment of the present disclosure, a positioning apparatus is provided. The foregoing apparatus may determine, based on the approximate location of the target terminal, the visibility status of the satellite to which the target terminal is connected, to implement classification of accuracy of the satellite signal and improve positioning accuracy for the target terminal.

In one embodiment, based on the embodiment corresponding to FIG. 10, in another embodiment of the positioning apparatus 20 provided in this embodiment of the present disclosure, the processing module 204 is specifically configured to: obtain visibility state values of N satellites based on the satellite visibility distribution information, a value of N being the number of satellites to which the target terminal is connected;

calculate carrier-to-noise ratio state values of the N satellites based on the satellite signal carrier-to-noise ratios; and calculate satellite visibility probabilities of the N satellites based on visibility information of the N satellites and the carrier-to-noise ratio state values of the N satellites.

In this embodiment of the present disclosure, a positioning apparatus is provided. According to the foregoing apparatus, a process of calculating the satellite visibility probability based on the satellite visibility distribution information is added. This improves feasibility of the entire solution.

In one embodiment, based on the embodiment corresponding to FIG. 10, in another embodiment of the positioning apparatus 20 provided in this embodiment of the present disclosure, the processing module 204 is specifically configured to:

calculate the positioning information of the target terminal based on the satellite visibility probability and the satellite signal through real-time kinematic (RTK) differential positioning.

In one embodiment, based on the embodiment corresponding to FIG. 10, in another embodiment of the positioning apparatus 20 provided in this embodiment of the present disclosure, the processing module 204 is specifically configured to: calculate a satellite observation weight matrix based on the satellite visibility probability and the satellite signal carrier-to-noise ratio, and construct an RTK differential equation based on the satellite signal; and perform calculation on the satellite observation weight matrix and the RTK differential equation by using a Gauss-Newton iteration method to obtain the positioning information of the target terminal.

In this embodiment of the present disclosure, a positioning apparatus is provided. The foregoing apparatus constructs the satellite observation weight matrix and the RTK differential equation, and performs calculation on the satellite observation weight matrix and the RTK differential equation by using the Gauss-Newton iteration method, to improve accuracy and reliability of the positioning information of the target terminal.

In one embodiment, based on the embodiment corresponding to FIG. 10, in another embodiment of the positioning apparatus 20 provided in this embodiment of the present disclosure, the processing module 204 is specifically configured to construct a terminal pseudorange observation weight matrix and a terminal carrier phase observation weight matrix based on the satellite visibility probability and the satellite signal carrier-to-noise ratio, the terminal pseudorange observation weight matrix and the terminal carrier phase observation weight matrix being used as the satellite observation weight matrix.

In this embodiment of the present disclosure, a positioning apparatus is provided. According to the foregoing apparatus, a specific implementation of the satellite observation weight matrix is provided, to improve feasibility and operability of the solution.

In one embodiment, the satellite data may include a pseudorange between the target terminal and a satellite and a carrier phase observation value between the target terminal and the satellite. Based on the embodiment corresponding to FIG. 10, in another embodiment of the positioning apparatus 20 provided in this embodiment of the present disclosure, the processing module 204 is specifically configured to: construct an RTK differential positioning constraint equation based on the pseudorange between the target terminal and the satellite and the carrier phase observation value between the target terminal and the satellite; and construct an RTK differential constraint modification equation based on the RTK differential positioning constraint equation, the RTK differential constraint modification equation and the RTK differential positioning constraint equation being used as the RTK differential equation.

In this embodiment of the present disclosure, a positioning apparatus is provided. According to the foregoing apparatus, a specific implementation of the RTK differential method is provided, to improve feasibility and operability of the solution.

In one embodiment, based on the embodiment corresponding to FIG. 10, in another embodiment of the positioning apparatus 20 provided in this embodiment of the present disclosure, the processing module 204 is specifically configured to: determine an estimated parameter modification amount equation based on the satellite observation weight matrix and the RTK differential equation;

obtain an initial estimated parameter $x_0$;

iteratively calculate an estimated parameter modification amount $\Delta x_k$ by using the Gauss-Newton iteration method and the estimated parameter modification amount equation, and iteratively update the initial estimated parameter $x_0$ based on the estimated parameter modification amount $\Delta x_k$ to obtain an estimated parameter $x_k$, k indicating the number of iterations; and output the estimated parameter $x_k$ in a case that the estimated parameter $x_k$ meets a preset condition, the estimated parameter $x_k$ being used as the positioning information of the target terminal.

In this embodiment of the present disclosure, a positioning apparatus is provided. According to the foregoing apparatus, an update iteration process of the Gauss-Newton iteration method is provided, to improve feasibility and operability of the solution.

In one embodiment, the satellite observation weight matrix includes a terminal pseudorange observation weight matrix and a terminal carrier phase observation weight matrix. Based on the embodiment corresponding to FIG. 10, in another embodiment of the positioning apparatus 20 provided in this embodiment of the present disclosure, the processing module 204 is specifically configured to determine the estimated parameter modification amount equation based on the terminal pseudorange observation weight matrix, the terminal carrier phase observation weight matrix, and the RTK differential equation.

In this embodiment of the present disclosure, a positioning apparatus is provided. According to the foregoing apparatus, a specific manner of constructing the estimated parameter modification amount equation is provided, to improve feasibility of the solution.

In one embodiment, based on the embodiment corresponding to FIG. 10, in another embodiment of the positioning apparatus 20 provided in this embodiment of the present disclosure, the processing module is specifically configured to: add the estimated parameter modification amount $\Delta x_1$ to the initial estimated parameter $x_0$ to obtain an estimated parameter $x_1$ after the first iterative update; add the estimated parameter modification amount $\Delta x_2$ to the estimated parameter $x_1$ to obtain an estimated parameter $x_2$ after the second iterative update; and by analogy, obtain an estimated parameter $x_k$ after a $k^{th}$ iterative update.

In this embodiment of the present disclosure, a positioning apparatus is provided. According to the foregoing apparatus, a specific implementation of iteratively updating the estimated parameter is provided, to improve feasibility and operability of the solution.

In one embodiment, based on the embodiment corresponding to FIG. 10, in another embodiment of the positioning apparatus 20 provided in this embodiment of the present disclosure, the obtaining module 201 is specifically configured to: obtain an ephemeris and satellite observation data that are transmitted by a continuously operating reference station CORS system, the satellite observation data being satellite observation data relative to the target terminal; and obtain the approximate location based on the ephemeris and the satellite observation data.

In this embodiment of the present disclosure, a positioning apparatus is provided. The foregoing apparatus can obtain the approximate location of the target terminal more directly. This improves convenience of positioning.

In one embodiment, based on the embodiment corresponding to FIG. 10, in another embodiment of the positioning apparatus 20 provided in this embodiment of the present disclosure, the obtaining module 201 is specifically configured to: obtain an ephemeris and satellite observation data that are transmitted by the target terminal, the satellite observation data being satellite observation data relative to the target terminal; and obtain the approximate location based on the ephemeris and the satellite observation data.

In this embodiment of the present disclosure, a positioning apparatus is provided. According to the foregoing apparatus, another positioning apparatus is used for implementing a positioning process. This avoids a hardware limitation in the case of positioning by the terminal device, and can increase a calculation speed during positioning.

Figure 11:
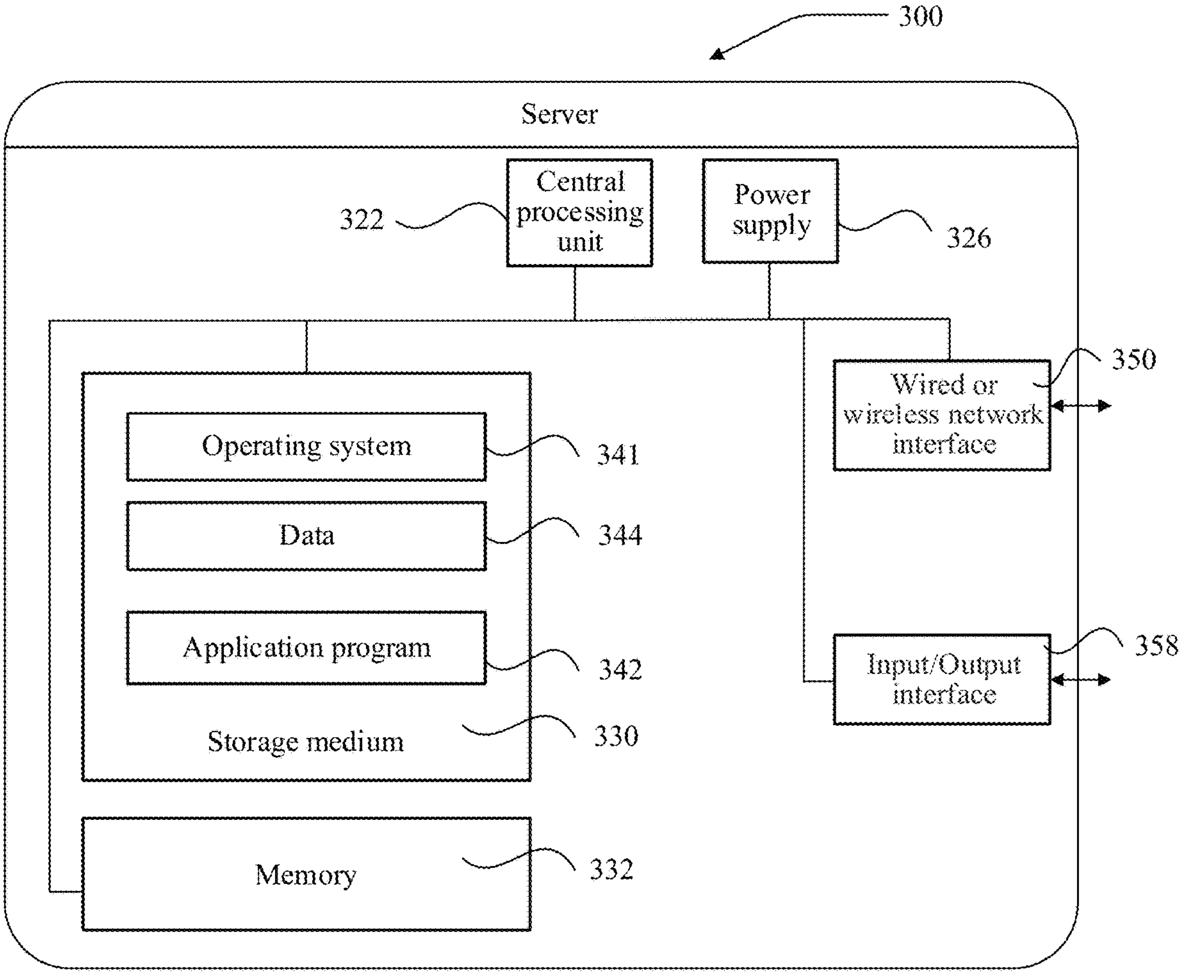
FIG. 11 is a schematic diagram of another embodiment of a positioning apparatus according to an embodiment of the present disclosure.

The positioning apparatus provided in the present disclosure may be applied to a server. FIG. 11 is a schematic structural diagram of a server according to an embodiment of the present disclosure. The server 300 may vary greatly due to different configurations or performance, and may include one or more central processing units (CPUs) 322 (for example, one or more processors) and a memory 332, and one or more storage media 330 (for example, one or more mass storage devices) that store application programs 342 or data 344. The memory 332 and the storage medium 330 may be transient storages or persistent storages. A program stored in the storage medium 330 may include one or more modules (which are not marked in the figure), and each module may include a series of instruction operations on the server. Further, the central processing unit 322 may be set to communicate with the storage medium 330, and execute, on the server 300, a series of instruction operations in the storage medium 330.

The server 300 may further include one or more power supplies 326, one or more wired or wireless network interfaces 350, one or more input/output interfaces 358, and/or one or more operating systems 341 such as Windows Server™, Mac OS X™, Unix™, Linux™, or FreeBSD™.

The steps performed by the terminal device in the foregoing embodiments may also be applied to the server structure shown in FIG. 11.

Figure 12:
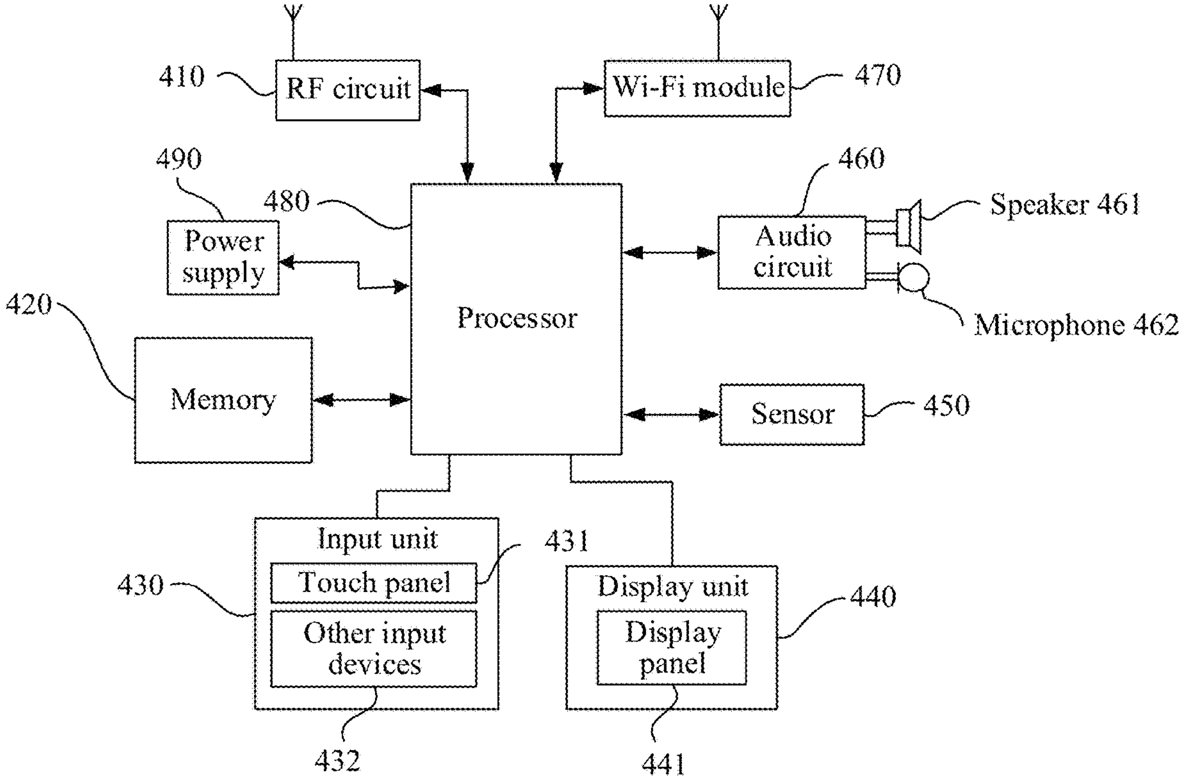
FIG. 12 is a schematic diagram of another embodiment of a positioning apparatus according to an embodiment of the present disclosure.

The positioning apparatus provided in the present disclosure may be applied to a terminal device. For ease of description, FIG. 12 shows only a part related to this embodiment of the present disclosure. For specific technical details not disclosed, refer to the method part in the embodiments of the present disclosure. This embodiment of the present disclosure is described by using an example in which the terminal device is a smartphone.

FIG. 12 is a block diagram of a partial structure of a smartphone related to a terminal device according to an embodiment of the present disclosure. As shown in FIG. 12, the smartphone includes components such as a radio frequency (RF) circuit 410, a memory 420, an input unit 430, a display unit 440, a sensor 450, an audio circuit 460, a wireless fidelity (wireless fidelity, Wi-Fi) module 470, a processor 480, and a power supply 490. The input unit 430 may include a touch panel 431 and other input devices 432. The display unit 440 may include a display panel 441. The audio circuit 460 may include a speaker 461 and a microphone 462. A person skilled in the art can understand that the structure of the smartphone shown in FIG. 12 does not constitute a limitation on the smartphone, and the smartphone may include more or fewer components than those shown in the figure, or some components may be combined, or the components may be disposed in different manners.

The memory 420 may be configured to store a software program and module. The processor 480 runs the software program and module stored in the memory 420, to implement various functional applications and data processing of the smartphone. The memory 420 may mainly include a program storage region and a data storage region. The program storage region may store an operating system, an application program required by at least one function (for example, a sound playing function and an image playing function), or the like. The data storage region may store data (for example, audio data and an address book) created based on use of the smartphone, or the like. In addition, the memory 420 may include a high-speed random access memory, or may include a non-volatile memory, for example, at least one magnetic disk storage device or a flash memory, or another volatile solid-state storage device.

In one embodiment, the processor 480 is a control center of the smartphone, connects various parts of the entire smartphone through various interfaces and lines, and performs various functions and data processing of the smartphone by running or executing a software program and/or module stored in the memory 420 and invoking data stored in the memory 420, to monitor the entire smartphone. In one embodiment, the processor 480 may include one or more processing units. In one embodiment, the processor 480 may integrate an application processor and a modem processor. The application processor mainly processes an operating system, a user interface, an application program, and the like. The modem processor mainly processes wireless communication. It can be understood that the modem processor may alternatively not be integrated in the processor 480.

In one embodiment, the steps performed by the terminal device in the foregoing embodiments may be based on the terminal device structure shown in FIG. 12.

An embodiment of the present disclosure further provides a computer-readable storage medium. The computer-readable storage medium stores a computer program. When the computer program runs on a computer, the computer is enabled to perform the method described in the foregoing embodiments.

An embodiment of the present disclosure further provides a computer program product including a computer program. When the computer program product runs on a computer, the computer is enabled to perform the method described in the foregoing embodiments.

A person skilled in the art can clearly understand that, for ease and brevity of description, for specific working processes of the foregoing systems, apparatuses, and units, reference may be made to corresponding processes in the foregoing method embodiments, and details are not described herein again.

In the several embodiments provided in the present disclosure, it is to be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of the present disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, for example, a USB flash drive, a removable hard disk, a read-only memory (ROM), a random access memory (RAM), a magnetic disk, or an optical disc.

The foregoing embodiments are merely used for describing the technical solutions of the present disclosure, but are not intended to limit the present disclosure. Although the present disclosure is described in detail with reference to the foregoing embodiments, it is to be understood by a person skilled in the art that modifications may still be made to the technical solutions described in the foregoing embodiments, or equivalent replacements may be made to some of the technical features, and these modifications or replacements do not cause the essence of corresponding technical solutions to depart from the spirit and scope of the technical solutions of the embodiments of the present disclosure.

What is claimed is:

1. A positioning method, performed by a computer device and comprising:

obtaining an approximate location of a target terminal to be positioned;

obtaining a satellite signal carrier-to-noise ratio of a satellite signal received by the target terminal;

transmitting the approximate location to a three-dimensional city model server;

receiving three-dimensional building information transmitted by the three-dimensional city model server, the three-dimensional building information being calculated by the three-dimensional city model server based on the approximate location;

calculating a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal, wherein the calculating the satellite visibility probability of the target satellite based on the approximate location, the three-dimensional building information, and the satellite signal carrier-to-noise ratio comprises: calculating satellite visibility distribution information based on the three-dimensional building information and the approximate location, the satellite visibility distribution information indicating a visibility status of a corresponding satellite from which the target terminal is capable of receiving a satellite signal; and calculating the satellite visibility probability based on the satellite signal carrier-to-noise ratio and the satellite visibility distribution information; and calculating positioning information of the target terminal based on the satellite visibility probability and the satellite signal, wherein the calculating satellite visibility distribution information based on the three-dimensional building information and the approximate location comprises:

determining an elevation and an azimuth of the target satellite relative to the target terminal based on the approximate location and a location of the target satellite; and in response to determining, based on the three-dimensional building information, that no building is blocking at the azimuth, determining that the target satellite is in the visible state relative to the target terminal; or in response to determining, based on the three-dimensional building information, that a building is blocking at the azimuth, calculating an intersection point K between the building and the target terminal and coordinate information of the intersection point K based on the three-dimensional building information and the azimuth;

calculating an elevation of the target satellite relative to the intersection point K based on the coordinate information of the intersection point K; and in response to the elevation of the target satellite relative to the target terminal being less than or equal to the elevation of the target satellite relative to the intersection point K, determining that the target satellite is in an invisible state relative to the target terminal; or in response to the elevation of the target satellite relative to the target terminal being greater than the elevation of the target satellite relative to the intersection point K, determining that the target satellite is in the visible state relative to the target terminal.

2. The positioning method according to claim 1, wherein the calculating the satellite visibility probability based on the satellite signal carrier-to-noise ratio and the satellite visibility distribution information comprises:

obtaining visibility state values of N satellites based on the satellite visibility distribution information, a value of N being the number of satellites to which the target terminal is connected;

calculating carrier-to-noise ratio state values of the N satellites based on the satellite signal carrier-to-noise ratios; and calculating satellite visibility probabilities of the N satellites based on visibility information of the N satellites and the carrier-to-noise ratio state values of the N satellites.

3. The positioning method according to claim 1, wherein the calculating the positioning information of the target terminal based on the satellite visibility probability and the satellite signal comprises:

calculating the positioning information of the target terminal based on the satellite visibility probability and the satellite signal through real-time kinematic (RTK) differential positioning.

4. The positioning method according to claim 3, wherein the calculating the positioning information of the target terminal based on the satellite visibility probability and the satellite signal through the RTK differential positioning comprises:

calculating a satellite observation weight matrix based on the satellite visibility probability and the satellite signal carrier-to-noise ratio, and constructing an RTK differential equation based on the satellite signal; and performing calculation on the satellite observation weight matrix and the RTK differential equation by using a Gauss-Newton iteration method to obtain the positioning information of the target terminal.

5. The positioning method according to claim 4, wherein the calculating the satellite observation weight matrix based on the satellite visibility probability and the satellite signal carrier-to-noise ratio comprises:

constructing a terminal pseudorange observation weight matrix and a terminal carrier phase observation weight matrix based on the satellite visibility probability and the satellite signal carrier-to-noise ratio, the terminal pseudorange observation weight matrix and the terminal carrier phase observation weight matrix being used as the satellite observation weight matrix.

6. The positioning method according to claim 4, wherein the satellite signal comprises a pseudorange between the target terminal and a satellite and a carrier phase observation value between the target terminal and the satellite, and the constructing the RTK differential equation based on the satellite signal comprises:

constructing an RTK differential positioning constraint equation based on the pseudorange between the target terminal and the satellite and the carrier phase observation value between the target terminal and the satellite; and constructing an RTK differential constraint modification equation based on the RTK differential positioning constraint equation, the RTK differential constraint modification equation and the RTK differential positioning constraint equation being used as the RTK differential equation.

7. The positioning method according to claim 4, wherein the performing calculation on the satellite observation weight matrix and the RTK differential equation by using the Gauss-Newton iteration method to obtain the positioning information of the target terminal comprises:

determining an estimated parameter modification amount equation based on the satellite observation weight matrix and the RTK differential equation;

obtaining an initial estimated parameter $x_0$;

iteratively calculating an estimated parameter modification amount $\Delta x_k$ by using the Gauss-Newton iteration method and the estimated parameter modification amount equation, and iteratively updating the initial estimated parameter $x_0$ based on the estimated parameter modification amount $\Delta x_k$ to obtain an estimated parameter $x_k$, k indicating the number of iterations; and outputting the estimated parameter $x_k$ in response to the estimated parameter $x_k$ meeting a preset condition, the estimated parameter $x_k$ being used as the positioning information of the target terminal.

8. The positioning method according to claim 7, wherein the satellite observation weight matrix comprises a terminal pseudorange observation weight matrix and a terminal carrier phase observation weight matrix, and the determining the estimated parameter modification amount equation based on the satellite observation weight matrix and the RTK differential equation comprises:

determining the estimated parameter modification amount equation based on the terminal pseudorange observation weight matrix, the terminal carrier phase observation weight matrix, and the RTK differential equation.

9. The positioning method according to claim 7, wherein the iteratively updating the initial estimated parameter $x_0$ based on the estimated parameter modification amount $\Delta x_k$ to obtain the estimated parameter $x_k$ comprises:

adding the estimated parameter modification amount $\Delta x_1$ to the initial estimated parameter $x_0$ to obtain an estimated parameter $x_1$ after a first iterative update of the iterations;

adding the estimated parameter modification amount $\Delta x_2$ to the estimated parameter $x_1$ to obtain an estimated parameter $x_2$ after a second iterative update of the iterations; and adding the estimated parameter modification amount $\Delta x_k$ to the estimated parameter $x_{k-1}$ to obtain the estimated parameter $X_k$.

10. The positioning method according to claim 1, wherein the obtaining the approximate location of the target terminal comprises:

obtaining an ephemeris and satellite observation data that are transmitted by a continuously operating reference station CORS system, the satellite observation data being satellite observation data relative to the target terminal; and obtaining the approximate location based on the ephemeris and the satellite observation data.

11. The positioning method according to claim 1, wherein the obtaining the approximate location of the target terminal comprises:

obtaining an ephemeris and satellite observation data that are transmitted by the target terminal, the satellite observation data being satellite observation data relative to the target terminal; and obtaining the approximate location based on the ephemeris and the satellite observation data.

12. A positioning apparatus, comprising:

at least one memory, and at least one processor, the at least one memory being configured to store a computer program;

the at least one processor being configured to execute the computer program in the at least one memory, and when the computer program is executed, the at least one processor being configured to perform:

obtaining an approximate location of a target terminal to be positioned;

obtaining a satellite signal carrier-to-noise ratio of a satellite signal received by the target terminal;

transmitting the approximate location to a three-dimensional city model server;

receiving three-dimensional building information transmitted by the three-dimensional city model server, the three-dimensional building information being calculated by the three-dimensional city model server based on the approximate location;

calculating a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal, wherein the calculating the satellite visibility probability of the target satellite based on the approximate location, the three-dimensional building information, and the satellite signal carrier-to-noise ratio comprises: calculating satellite visibility distribution information based on the three-dimensional building information and the approximate location, the satellite visibility distribution information indicating a visibility status of a corresponding satellite from which the target terminal is capable of receiving a satellite signal; and calculating the satellite visibility probability based on the satellite signal carrier-to-noise ratio and the satellite visibility distribution information; and calculating positioning information of the target terminal based on the satellite visibility probability and the satellite signal, wherein the calculating satellite visibility distribution information based on the three-dimensional building information and the approximate location comprises:

determining an elevation and an azimuth of the target satellite relative to the target terminal based on the approximate location and a location of the target satellite; and in response to determining, based on the three-dimensional building information, that no building is blocking at the azimuth, determining that the target satellite is in the visible state relative to the target terminal; or in response to determining, based on the three-dimensional building information, that a building is blocking at the azimuth, calculating an intersection point K between the building and the target terminal and coordinate information of the intersection point K based on the three-dimensional building information and the azimuth;

calculating an elevation of the target satellite relative to the intersection point K based on the coordinate information of the intersection point K; and in response to the elevation of the target satellite relative to the target terminal being less than or equal to the elevation of the target satellite relative to the intersection point K, determining that the target satellite is in an invisible state relative to the target terminal; or in response to the elevation of the target satellite relative to the target terminal being greater than the elevation of the target satellite relative to the intersection point K, determining that the target satellite is in the visible state relative to the target terminal.

13. The positioning apparatus according to claim 12, wherein the calculating the satellite visibility probability based on the satellite signal carrier-to-noise ratio and the satellite visibility distribution information comprises:

obtaining visibility state values of N satellites based on the satellite visibility distribution information, a value of N being the number of satellites to which the target terminal is connected;

calculating carrier-to-noise ratio state values of the N satellites based on the satellite signal carrier-to-noise ratios; and calculating satellite visibility probabilities of the N satellites based on visibility information of the N satellites and the carrier-to-noise ratio state values of the N satellites.

14. The positioning apparatus according to claim 12, wherein the calculating the positioning information of the target terminal based on the satellite visibility probability and the satellite signal comprises:

calculating the positioning information of the target terminal based on the satellite visibility probability and the satellite signal through real-time kinematic (RTK) differential positioning.

15. The positioning apparatus according to claim 14, wherein the calculating the positioning information of the target terminal based on the satellite visibility probability and the satellite signal through the RTK differential positioning comprises:

calculating a satellite observation weight matrix based on the satellite visibility probability and the satellite signal carrier-to-noise ratio, and constructing an RTK differential equation based on the satellite signal; and performing calculation on the satellite observation weight matrix and the RTK differential equation by using a Gauss-Newton iteration method to obtain the positioning information of the target terminal.

16. A non-transitory computer-readable storage medium comprising a computer program, when the computer program runs on a computer, the computer being enabled to perform:

obtaining an approximate location of a target terminal to be positioned;

obtaining a satellite signal carrier-to-noise ratio of a satellite signal received by the target terminal;

transmitting the approximate location to a three-dimensional city model server;

receiving three-dimensional building information transmitted by the three-dimensional city model server, the three-dimensional building information being calculated by the three-dimensional city model server based on the approximate location;

calculating a satellite visibility probability of a target satellite based on the approximate location, the three-dimensional building information, and the satellite signal carrier-to-noise ratio, the target satellite being a corresponding satellite from which the target terminal receives the satellite signal, and the satellite visibility probability indicating a probability that the target satellite is in a visible state relative to the target terminal, wherein the calculating the satellite visibility probability of the target satellite based on the approximate location, the three-dimensional building information, and the satellite signal carrier-to-noise ratio comprises: calculating satellite visibility distribution information based on the three-dimensional building information and the approximate location, the satellite visibility distribution information indicating a visibility status of a corresponding satellite from which the target terminal is capable of receiving a satellite signal; and calculating the satellite visibility probability based on the satellite signal carrier-to-noise ratio and the satellite visibility distribution information; and calculating positioning information of the target terminal based on the satellite visibility probability and the satellite signal, wherein the calculating satellite visibility distribution information based on the three-dimensional building information and the approximate location comprises:

determining an elevation and an azimuth of the target satellite relative to the target terminal based on the approximate location and a location of the target satellite; and in response to determining, based on the three-dimensional building information, that no building is blocking at the azimuth, determining that the target satellite is in the visible state relative to the target terminal; or in response to determining, based on the three-dimensional building information, that a building is blocking at the azimuth, calculating an intersection point K between the building and the target terminal and coordinate information of the intersection point K based on the three-dimensional building information and the azimuth;

calculating an elevation of the target satellite relative to the intersection point K based on the coordinate information of the intersection point K; and in response to the elevation of the target satellite relative to the target terminal being less than or equal to the elevation of the target satellite relative to the intersection point K, determining that the target satellite is in an invisible state relative to the target terminal; or in response to the elevation of the target satellite relative to the target terminal being greater than the elevation of the target satellite relative to the intersection point K, determining that the target satellite is in the visible state relative to the target terminal.

* * * * *